(12) United States Patent
Peng et al.

(10) Patent No.: US 8,040,321 B2
(45) Date of Patent: Oct. 18, 2011

(54) TOUCH-SENSOR WITH SHARED CAPACITIVE SENSORS

(75) Inventors: Tao Peng, Shanghai (CN); Zheng Qin, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 1088 days.

(21) Appl. No.: 11/484,085

(22) Filed: Jul. 10, 2006

(65) Prior Publication Data

US 2008/0007534 A1    Jan. 10, 2008

(51) Int. Cl.
- G06F 3/02 (2006.01)
- G09G 3/00 (2006.01)
- G09G 5/00 (2006.01)

(52) U.S. Cl. ........................................ 345/169; 345/156

(58) Field of Classification Search ........... 345/156–184
See application file for complete search history.

(56) References Cited

U.S. PATENT DOCUMENTS

| | | |
|---|---|---|
| 3,696,908 A | 10/1972 | Gluck et al. |
| 3,750,113 A | 7/1973 | Cencel |
| 3,974,332 A | 8/1976 | Abe et al. |
| 4,087,625 A | 5/1978 | Dym et al. |
| 4,103,252 A | 7/1978 | Bobick |
| 4,157,539 A | 6/1979 | Hunts et al. |
| 4,163,222 A | 7/1979 | Grove |
| 4,175,239 A | 11/1979 | Sandler |
| 4,235,871 A | 11/1980 | Papahadjopoulos et al. |
| 4,264,903 A | 4/1981 | Bigelow |
| 4,283,713 A | 8/1981 | Philipp |
| 4,305,135 A | 12/1981 | Dahl et al. |
| 4,340,777 A | 7/1982 | DeCosta et al. |
| 4,405,917 A | 9/1983 | Chai |
| 4,405,918 A | 9/1983 | Wall et al. |
| 4,438,404 A | 3/1984 | Philipp |
| 4,475,151 A | 10/1984 | Philipp |
| 4,495,485 A | 1/1985 | Smith |
| 4,497,575 A | 2/1985 | Philipp |
| 4,550,221 A | 10/1985 | Mabusth |
| 4,614,937 A | 9/1986 | Poujois |
| 4,622,437 A | 11/1986 | Bloom et al. |
| 4,659,874 A | 4/1987 | Landmeier |
| 4,680,430 A | 7/1987 | Yoshikawa et al. |
| 4,705,919 A | 11/1987 | Dhawan |
| 4,727,767 A | 3/1988 | Aiki et al. |
| 4,736,097 A | 4/1988 | Philipp |
| 4,736,191 A | 4/1988 | Matzke et al. |
| 4,737,768 A | 4/1988 | Lewiner et al. |

(Continued)

FOREIGN PATENT DOCUMENTS

EP    0574213 A1    6/1993

(Continued)

OTHER PUBLICATIONS

Seguine, Ryan and Mark Lee, "Layout Guidelines for PSoC CapSense", Cypress Perform, Oct. 31, 2005, 15 pages.

(Continued)

*Primary Examiner* — Srilakshmi K Kumar

(57) ABSTRACT

A method and apparatus to implement a touch-sensor device using shared capacitive sensors. The apparatus includes a first plurality of sensor elements coupled together, a second plurality of sensor elements coupled together independently of the first plurality of sensor elements, and a third plurality of sensor elements coupled together independently of the first and second pluralities of sensor elements. The sensor elements of the first, second, and third pluralities of sensor elements are interspersed and disposed in a repetitive sequence along a movement path of a conductive object.

18 Claims, 12 Drawing Sheets

U.S. PATENT DOCUMENTS

| | | |
|---|---|---|
| 4,772,874 A | 9/1988 | Hasegawa |
| 4,773,024 A | 9/1988 | Faggin et al. |
| 4,802,103 A | 1/1989 | Faggin et al. |
| 4,876,534 A | 10/1989 | Mead et al. |
| 4,879,461 A | 11/1989 | Philipp |
| 4,879,508 A | 11/1989 | Andermo |
| 4,935,702 A | 6/1990 | Mead et al. |
| 4,952,757 A | 8/1990 | Purcell et al. |
| 4,953,928 A | 9/1990 | Anderson et al. |
| 4,954,823 A | 9/1990 | Binstead |
| 4,962,342 A | 10/1990 | Mead et al. |
| 4,999,462 A | 3/1991 | Purcell |
| 5,049,758 A | 9/1991 | Mead et al. |
| 5,055,827 A | 10/1991 | Philipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,095,284 A | 3/1992 | Mead |
| 5,097,305 A | 3/1992 | Mead et al. |
| 5,107,149 A | 4/1992 | Platt et al. |
| 5,109,261 A | 4/1992 | Mead et al. |
| 5,119,038 A | 6/1992 | Anderson et al. |
| 5,120,996 A | 6/1992 | Mead et al. |
| 5,122,800 A | 6/1992 | Philipp |
| 5,126,685 A | 6/1992 | Platt et al. |
| 5,146,106 A | 9/1992 | Anderson et al. |
| 5,160,899 A | 11/1992 | Anderson et al. |
| 5,165,054 A | 11/1992 | Platt et al. |
| 5,166,562 A | 11/1992 | Allen et al. |
| 5,204,549 A | 4/1993 | Platt et al. |
| 5,208,725 A | 5/1993 | Akcasu |
| 5,243,554 A | 9/1993 | Allen et al. |
| 5,248,873 A | 9/1993 | Allen et al. |
| 5,260,592 A | 11/1993 | Mead et al. |
| 5,270,963 A | 12/1993 | Allen et al. |
| 5,276,407 A | 1/1994 | Mead et al. |
| 5,289,023 A | 2/1994 | Mead |
| 5,303,329 A | 4/1994 | Mead et al. |
| 5,305,017 A | 4/1994 | Gerpheide |
| 5,324,958 A | 6/1994 | Mead et al. |
| 5,331,215 A | 7/1994 | Allen et al. |
| 5,336,936 A | 8/1994 | Allen et al. |
| 5,339,213 A | 8/1994 | O'Callaghan |
| 5,349,303 A | 9/1994 | Gerpheide |
| 5,374,787 A | 12/1994 | Miller et al. |
| 5,381,515 A | 1/1995 | Platt et al. |
| 5,384,467 A | 1/1995 | Plimon et al. |
| 5,408,194 A | 4/1995 | Steinbach et al. |
| 5,424,756 A | 6/1995 | Ho et al. |
| 5,463,388 A | 10/1995 | Boie et al. |
| 5,488,204 A | 1/1996 | Mead et al. |
| 5,495,077 A | 2/1996 | Miller et al. |
| 5,499,026 A | 3/1996 | Liao et al. |
| 5,508,700 A | 4/1996 | Taylor et al. |
| 5,541,878 A | 7/1996 | LeMoncheck et al. |
| 5,543,588 A | 8/1996 | Bisset et al. |
| 5,543,590 A | 8/1996 | Gillespie et al. |
| 5,543,591 A | 8/1996 | Gillespie et al. |
| 5,555,907 A | 9/1996 | Philipp |
| 5,565,658 A | 10/1996 | Gerpheide et al. |
| 5,566,702 A | 10/1996 | Philipp |
| 5,629,891 A | 5/1997 | LeMoncheck et al. |
| 5,646,377 A | 7/1997 | Oda |
| 5,648,642 A | 7/1997 | Miller et al. |
| 5,682,032 A | 10/1997 | Philipp |
| 5,730,165 A | 3/1998 | Philipp |
| 5,748,185 A | 5/1998 | Stephan et al. |
| 5,757,368 A | 5/1998 | Gerpheide et al. |
| 5,763,909 A | 6/1998 | Mead et al. |
| 5,767,457 A | 6/1998 | Gerpheide et al. |
| 5,796,183 A | 8/1998 | Hourmand |
| 5,812,698 A | 9/1998 | Platt et al. |
| 5,841,078 A | 11/1998 | Miller et al. |
| 5,844,265 A | 12/1998 | Mead et al. |
| 5,844,506 A | 12/1998 | Binstead |
| 5,854,625 A | 12/1998 | Frisch et al. |
| 5,856,822 A | 1/1999 | Du et al. |
| 5,861,583 A | 1/1999 | Schediwy et al. |
| 5,861,875 A | 1/1999 | Gerpheide |
| 5,864,242 A | 1/1999 | Allen et al. |
| 5,864,392 A | 1/1999 | Winklhofer et al. |
| 5,869,790 A | 2/1999 | Shigetaka et al. |
| 5,880,411 A | 3/1999 | Gillespie et al. |
| 5,889,236 A | 3/1999 | Gillespie et al. |
| 5,914,465 A | 6/1999 | Allen et al. |
| 5,914,708 A | 6/1999 | LaGrange et al. |
| 5,920,310 A | 7/1999 | Faggin et al. |
| 5,926,566 A | 7/1999 | Wang et al. |
| 5,942,733 A | 8/1999 | Allen et al. |
| 5,943,052 A | 8/1999 | Allen et al. |
| 5,969,513 A | 10/1999 | Clark |
| 5,996,100 A | 11/1999 | Noble et al. |
| 6,023,422 A | 2/2000 | Allen et al. |
| 6,025,726 A | 2/2000 | Gershenfeld et al. |
| 6,028,271 A | 2/2000 | Gillespie et al. |
| 6,028,959 A | 2/2000 | Wang et al. |
| 6,037,929 A | 3/2000 | Ogura et al. |
| 6,037,930 A | 3/2000 | Wolfe et al. |
| 6,067,019 A | 5/2000 | Scott |
| 6,097,432 A | 8/2000 | Mead et al. |
| 6,147,680 A | 11/2000 | Tareev |
| 6,148,104 A | 11/2000 | Wang et al. |
| 6,185,450 B1 | 2/2001 | Seguine et al. |
| 6,188,228 B1 | 2/2001 | Philipp |
| 6,188,391 B1 | 2/2001 | Seely et al. |
| 6,222,522 B1 | 4/2001 | Matthews et al. |
| 6,222,528 B1 | 4/2001 | Gerpheide et al. |
| 6,239,389 B1 | 5/2001 | Allen et al. |
| 6,249,447 B1 | 6/2001 | Boylan et al. |
| 6,262,717 B1 | 7/2001 | Donohue et al. |
| 6,271,835 B1 | 8/2001 | Hoeksma |
| 6,280,391 B1 | 8/2001 | Olson et al. |
| 6,288,707 B1 | 9/2001 | Philipp |
| 6,295,052 B1 | 9/2001 | Kato et al. |
| 6,297,811 B1 | 10/2001 | Kent et al. |
| 6,304,014 B1 | 10/2001 | England et al. |
| 6,320,184 B1 | 11/2001 | Winklhofer et al. |
| 6,323,846 B1 | 11/2001 | Westerman et al. |
| 6,326,859 B1 | 12/2001 | Goldman et al. |
| 6,353,200 B1 | 3/2002 | Schwankhart |
| 6,377,009 B1 | 4/2002 | Philipp |
| 6,380,929 B1 | 4/2002 | Platt |
| 6,380,931 B1 | 4/2002 | Gillespie et al. |
| 6,414,671 B1 | 7/2002 | Gillespie et al. |
| 6,424,338 B1 | 7/2002 | Anderson |
| 6,429,857 B1 | 8/2002 | Masters et al. |
| 6,430,305 B1 | 8/2002 | Decker |
| 6,441,073 B1 | 8/2002 | Tanaka et al. |
| 6,452,514 B1 | 9/2002 | Philipp |
| 6,457,355 B1 | 10/2002 | Philipp |
| 6,466,036 B1 | 10/2002 | Philipp |
| 6,473,069 B1 | 10/2002 | Gerpheide |
| 6,489,899 B1 | 12/2002 | Ely et al. |
| 6,498,720 B2 | 12/2002 | Glad |
| 6,499,359 B1 | 12/2002 | Washeleski et al. |
| 6,504,530 B1 | 1/2003 | Wilson et al. |
| 6,522,128 B1 | 2/2003 | Ely et al. |
| 6,523,416 B2 | 2/2003 | Takagi et al. |
| 6,534,970 B1 | 3/2003 | Ely et al. |
| 6,535,200 B2 | 3/2003 | Philipp |
| 6,570,557 B1 | 5/2003 | Westerman et al. |
| 6,574,095 B2 | 6/2003 | Suzuki |
| 6,587,093 B1 | 7/2003 | Shaw et al. |
| 6,597,347 B1 | 7/2003 | Yasutake |
| 6,610,936 B2 | 8/2003 | Gillespie et al. |
| 6,624,640 B2 | 9/2003 | Lund et al. |
| 6,639,586 B2 | 10/2003 | Gerpheide |
| 6,642,857 B1 | 11/2003 | Schediwy et al. |
| 6,649,924 B1 | 11/2003 | Philipp et al. |
| 6,667,740 B2 | 12/2003 | Ely et al. |
| 6,673,308 B2 | 1/2004 | Hino et al. |
| 6,677,932 B1 | 1/2004 | Westerman |
| 6,680,731 B2 | 1/2004 | Gerpheide et al. |
| 6,683,462 B2 | 1/2004 | Shimizu |
| 6,704,005 B2 | 3/2004 | Kato et al. |
| 6,705,511 B1 | 3/2004 | Dames et al. |

| | | |
|---|---|---|
| 6,714,817 B2 | 3/2004 | Daynes et al. |
| 6,730,863 B1 | 5/2004 | Gerpheide |
| 6,750,852 B2 | 6/2004 | Gillespie et al. |
| 6,762,752 B2 | 7/2004 | Perski et al. |
| 6,774,644 B2 | 8/2004 | Eberlein |
| 6,788,221 B1 | 9/2004 | Ely et al. |
| 6,788,521 B2 | 9/2004 | Nishi |
| 6,798,218 B2 | 9/2004 | Kasperkovitz |
| 6,809,275 B1 | 10/2004 | Cheng et al. |
| 6,825,890 B2 | 11/2004 | Matsufusa |
| 6,847,706 B2 | 1/2005 | Bozorgui-Nesbat |
| 6,856,433 B2 | 2/2005 | Hatano et al. |
| 6,861,961 B2 | 3/2005 | Sandbach et al. |
| 6,873,203 B1 | 3/2005 | Latham, II et al. |
| 6,879,930 B2 | 4/2005 | Sinclair et al. |
| 6,888,538 B2 | 5/2005 | Ely et al. |
| 6,893,724 B2 | 5/2005 | Lin et al. |
| 6,903,402 B2 | 6/2005 | Miyazawa |
| 6,904,570 B2 | 6/2005 | Foote et al. |
| 6,947,031 B2 | 9/2005 | Sandbach et al. |
| 6,949,811 B2 | 9/2005 | Miyazawa |
| 6,969,978 B2 | 11/2005 | Dening |
| 6,970,160 B2 | 11/2005 | Mulligan et al. |
| 6,975,123 B1 | 12/2005 | Malang et al. |
| 7,002,557 B2 | 2/2006 | Iizuka et al. |
| 7,006,078 B2 | 2/2006 | Kim |
| 7,030,782 B2 | 4/2006 | Ely et al. |
| 7,030,860 B1 | 4/2006 | Hsu et al. |
| 7,046,230 B2 | 5/2006 | Zadesky et al. |
| 7,050,927 B2 | 5/2006 | Sinclair et al. |
| 7,109,978 B2 | 9/2006 | Gillespie et al. |
| 7,119,550 B2 | 10/2006 | Kitano |
| 7,129,935 B2 | 10/2006 | Mackey |
| 7,133,140 B2 | 11/2006 | Lukacs et al. |
| 7,133,793 B2 | 11/2006 | Ely et al. |
| 7,141,968 B2 | 11/2006 | Hibbs et al. |
| 7,141,987 B2 | 11/2006 | Hibbs et al. |
| 7,151,276 B2 | 12/2006 | Gerlach et al. |
| 7,158,125 B2 | 1/2007 | Sinclair et al. |
| 7,202,855 B2 | 4/2007 | Shigetaka et al. |
| 7,202,857 B2 | 4/2007 | Hinckley et al. |
| 7,202,859 B1 | 4/2007 | Speck et al. |
| 7,212,189 B2 | 5/2007 | Shaw et al. |
| 7,239,302 B2 | 7/2007 | Kim |
| 7,288,977 B2 | 10/2007 | Stanley |
| 7,298,124 B2 | 11/2007 | Kan et al. |
| 7,301,350 B2 | 11/2007 | Hargreaves et al. |
| 7,301,351 B2 | 11/2007 | Deangelis et al. |
| 7,327,352 B2 | 2/2008 | Keefer et al. |
| 7,362,244 B2 | 4/2008 | Sun |
| 7,362,313 B2 | 4/2008 | Geaghan et al. |
| 7,382,139 B2 | 6/2008 | Mackey |
| 7,423,635 B2 | 9/2008 | Taylor et al. |
| 7,439,962 B2 | 10/2008 | Reynolds et al. |
| 7,446,300 B2 | 11/2008 | Silvestre |
| 7,450,113 B2 | 11/2008 | Gillespie et al. |
| 7,466,307 B2 | 12/2008 | Trent et al. |
| 7,479,949 B2 | 1/2009 | Jobs et al. |
| 7,532,205 B2 | 5/2009 | Gillespie et al. |
| 7,539,513 B2 | 5/2009 | Cathey et al. |
| 7,548,073 B2 | 6/2009 | Mackey |
| 7,576,578 B2 | 8/2009 | Lii |
| 7,614,008 B2 | 11/2009 | Ording |
| 7,635,828 B2 | 12/2009 | Finley et al. |
| 7,656,392 B2 | 2/2010 | Bolender |
| 7,663,607 B2 | 2/2010 | Hotelling et al. |
| 7,710,397 B2 | 5/2010 | Krah et al. |
| 7,719,522 B2 | 5/2010 | Lyon et al. |
| 7,728,377 B2 | 6/2010 | Elsass et al. |
| 2002/0063688 A1 | 5/2002 | Shaw et al. |
| 2002/0136371 A1 | 9/2002 | Bozorgui-Nesbat |
| 2002/0191029 A1 | 12/2002 | Gillespie et al. |
| 2003/0014239 A1 | 1/2003 | Ichbiah et al. |
| 2003/0062889 A1 | 4/2003 | Ely et al. |
| 2003/0064326 A1 | 4/2003 | Yamamoto et al. |
| 2003/0080755 A1 | 5/2003 | Kobayashi |
| 2004/0017355 A1 | 1/2004 | Shim |
| 2005/0023145 A1 | 2/2005 | Cohen et al. |
| 2005/0024341 A1 | 2/2005 | Gillespie et al. |
| 2005/0088417 A1 | 4/2005 | Mulligan et al. |
| 2005/0179668 A1 | 8/2005 | Edwards |
| 2005/0231487 A1 | 10/2005 | Ming |
| 2006/0016800 A1 | 1/2006 | Paradiso et al. |
| 2006/0022955 A1 | 2/2006 | Kennedy |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0032680 A1 | 2/2006 | Elias et al. |
| 2006/0033724 A1 | 2/2006 | Chaudhri et al. |
| 2006/0066582 A1 | 3/2006 | Lyon et al. |
| 2006/0097991 A1 | 5/2006 | Hotelling et al. |
| 2006/0192690 A1 | 8/2006 | Philipp |
| 2006/0197752 A1 | 9/2006 | Hurst et al. |
| 2006/0197753 A1 | 9/2006 | Hotelling |
| 2006/0258390 A1 | 11/2006 | Cui et al. |
| 2006/0273804 A1 | 12/2006 | Delorme et al. |
| 2007/0008299 A1 | 1/2007 | Hristov |
| 2007/0063876 A1 | 3/2007 | Wong |
| 2007/0074913 A1 | 4/2007 | Geaghan et al. |
| 2007/0132737 A1 | 6/2007 | Mulligan et al. |
| 2007/0152983 A1 | 7/2007 | McKillop et al. |
| 2007/0176903 A1 | 8/2007 | Dahlin et al. |
| 2007/0177803 A1 | 8/2007 | Elias et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0236475 A1 | 10/2007 | Wherry |
| 2007/0236618 A1 | 10/2007 | Maag et al. |
| 2007/0247431 A1 | 10/2007 | Skillman et al. |
| 2007/0247443 A1 | 10/2007 | Philipp |
| 2007/0257894 A1 | 11/2007 | Philipp |
| 2007/0262962 A1 | 11/2007 | XiaoPing et al. |
| 2007/0273659 A1 | 11/2007 | XiaoPing et al. |
| 2007/0273660 A1 | 11/2007 | XiaoPing et al. |
| 2008/0001926 A1 | 1/2008 | XiaoPing et al. |
| 2008/0007434 A1 | 1/2008 | Hristov |
| 2008/0041640 A1 | 2/2008 | Gillespie et al. |
| 2008/0048997 A1 | 2/2008 | Gillespie et al. |
| 2008/0084400 A1 | 4/2008 | Rosenberg |
| 2008/0088602 A1 | 4/2008 | Hotelling |
| 2008/0122796 A1 | 5/2008 | Jobs et al. |
| 2008/0165132 A1 | 7/2008 | Weiss et al. |
| 2008/0165140 A1 | 7/2008 | Christie et al. |
| 2008/0165141 A1 | 7/2008 | Christie |
| 2008/0165255 A1 | 7/2008 | Christie et al. |
| 2008/0192005 A1 | 8/2008 | Elgoyhen et al. |
| 2008/0204426 A1 | 8/2008 | Hotelling et al. |
| 2008/0264699 A1 | 10/2008 | Chang et al. |
| 2008/0266263 A1 | 10/2008 | Motaparti et al. |
| 2008/0278178 A1 | 11/2008 | Philipp |
| 2008/0316183 A1 | 12/2008 | Westerman et al. |

FOREIGN PATENT DOCUMENTS

WO          WO 00/02188 A1      1/2000

OTHER PUBLICATIONS

Seguine, Dennis, "Capacitive Switch Scan", Cypress Semiconductor Corporation, Apr. 14, 2005, 6 pages.

Chapweske, Adam, "The PS/2 Mouse Interface", PS/2 Mouse Interfacing, 2001, 10 pages.

"CY8C21x34 Data Sheet", Cypress Semiconductor Corporation, CSR User Module, CSR v1.0, Oct. 6, 2005, pp. 1-36.

USPTO Non-Final Rejection for U.S. Appl. No. 11/395,674 dated Apr. 19, 2010; 15 pages.

USPTO Non-Final Rejection for U.S. Appl. No. 11/395,674 dated Nov. 18, 2009; 11 pages.

USPTO Final Rejection for U.S. Appl. No. 11/395,674 dated Jul. 16, 2009; 12 pages.

USPTO Non-Final Rejection for U.S. Appl. No. 11/395,674 dated Feb. 10, 2009; 10 pages.

USPTO Final Rejection for U.S. Appl. No. 11/432,130 dated Jul. 19, 2010; 15 pages.

USPTO Final Rejection for U.S. Appl. No. 11/432,130 dated Jul. 19, 2010; 15 pages.

USPTO Final Rejection for U.S. Appl. No. 11/432,130 dated Nov. 30, 2009; 15 pages.
USPTO Non-Final Rejection for U.S. Appl. No. 11/432,130 dated Jun. 9, 2009; 14 pages.
USPTO Requirement for Restriction/Election for U.S. Appl. No. 11/432,130 dated Mar. 31, 2009; 6 pages.
Chris Mack, "Semiconductor Lithography—The Basic Process," Gentleman Scientist, downloaded Apr. 20, 2006, <http://www.lithoguru.com/scientist/lithobasics.html>; 12 pages.
Wikipedia, the free encyclopedia, "Photolithography," downloaded Apr. 20, 2006, <http://en.wikipedia.org/wiki/Photolithography>; 3 pages.
USPTO Notice of Allowance for U.S. Appl. No. 11/396,179 dated May 20, 2010; 11 pages.
USPTO Notice of Allowance for U.S. Appl. No. 11/396,179 dated Oct. 8, 2009; 7 pages.
USPTO Non-Final Rejection for U.S. Appl. No. 11/396,179 dated Mar. 19, 2009; 25 pages.
USPTO Requirement for Restriction/Election for U.S. Appl. No. 11/396,179 dated Feb. 3, 2009; 6 pages.
USPTO Notice of Allowance for U.S. Appl. No. 11/440,924 dated Jul. 9, 2010; 6 pages.
USPTO Non-Final Rejection for U.S. Appl. No. 11/440,924 dated Jan. 20, 2010; 9 pages.
USPTO Notice of Allowance for U.S. Appl. No. 11/440,924 dated Sep. 23, 2009; 6 pages.
USPTO Non-Final Rejection for U.S. Appl. No. 11/440,924 dated Mar. 10, 2009; 9 pages.
"The Virtual Keyboard: I-Tech Bluetooth/Serial Virtual Laser Keyboard Available Now!" The Virtual Laser Keyboard (VKB) Online Worldwide Shop, <http://www.virtual-laser-keyboard.com>, downloaded Apr. 13, 2006; 4 pages.
"IBM PC Keyboard," Wikipedia, The Free Encyclopedia, <http://en.wikipedia.org/wiki/PC_keyboard>, downloaded May 19, 2006; 3 pages.
USPTO Non-Final Rejection for U.S. Appl. No. 11/480,016 dated Mar. 17, 2010; 17 pages.
USPTO Advisory Action for U.S. Appl. No. 11/480,016 dated Jan. 29, 2010; 3 pages.
USPTO Final Rejection for U.S. Appl. No. 11/480,016 dated Nov. 19, 2009; 16 pages.
USPTO Non-Final Rejection for U.S. Appl. No. 11/480,016 dated Apr. 10, 2009; 14 pages.
Hal Philipp, "Charge Transfer Sensing," Spread Spectrum Sensor Technology Blazes New Applications, 1997; 9 pages.
USPTO Final Rejection for U.S. Appl. No. 11/437,507 dated Apr. 15, 2010; 5 pages.
USPTO Non-Final Rejection for U.S. Appl. No. 11/437,507 dated Oct. 29, 2009; 5 pages.
USPTO Non-Final Rejection for U.S. Appl. No. 11/437,507 dated Feb. 23, 2009; 9 pages.
USPTO Final Rejection for U.S. Appl. No. 11/437,507 dated Nov. 14, 2008; 8 pages.
USPTO Non-Final Rejection for U.S. Appl. No. 11/437,507 dated Apr. 8, 2008; 5 pages.
USPTO Advisory Action for U.S. Appl. No. 11/437,507 dated Jul. 12, 2010; 2 pages.
USPTO Final Rejection for U.S. Appl. No. 11/442,044 dated Jun. 7, 2010; 17 pages.
USPTO Non-Final Rejection for U.S. Appl. No. 11/442,044 dated Jan. 22, 2010; 15 pages.
USPTO Advisory Action for U.S. Appl. No. 11/442,044 dated Dec. 9, 2009; 2 pages.
USPTO Final Rejection for U.S. Appl. No. 11/442,044 dated Sep. 28, 2009; 13 pages.
USPTO Non-Final Rejection for U.S. Appl. No. 11/442,044 dated Mar. 13, 2009; 11 pages.
USPTO Non-Final Rejection for U.S. Appl. No. 11/442,212 dated Jul. 6, 2010; 13 pages.
USPTO Advisory Action for U.S. Appl. No. 11/442,212 dated Dec. 17, 2009; 3 pages.
USPTO Final Rejection for U.S. Appl. No. 11/442,212 dated Oct. 2, 2009; 12 pages.
USPTO Non-Final Rejection for U.S. Appl. No. 11/442,212 dated Mar. 31, 2009; 12 pages.
USPTO Non-Final Rejection for U.S. Appl. No. 11/343,402 dated Mar. 17, 2010; 11 pages.
USPTO Final Rejection for U.S. Appl. No. 11/343,402 dated Nov. 30, 2009; 12 pages.
USPTO Non-Final Rejection for U.S. Appl. No. 11/343,402 dated Apr. 1, 2009; 11 pages.
USPTO Requirement for Restriction/Election for U.S. Appl. No. 11/343,402 dated Dec. 15, 2008; 6 pages.
Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.
Cypress Semiconductor Corporation, "PSoC CY8C20x34 Technical Reference Manual (TRM)," PSoC CY8C20x34 TRM, Version 1.0, 2006; 220 pages.
Lee, Mark; "EMC Design Considerations for PSoC CapSense Applications," Cypress Semiconductor Corporation, Application Note AN2318; Sep. 16, 2005; 6 pages.
Cypress Semiconductor Corporation, "Release Notes srn017," Jan., 24, 2007; 3 pages.
Sedra et al., "Microelectronic Circuits," 3rd Edition, 1991, Oxford University Press, Feb. 5, 2007; 20 pages.
Van Ess, David; "Simulating a 555 Timer with PSoC," Cypress Semiconductor Corporation, Application Note AN2286, May 19, 2005; 10 pages.
Cypress Semiconductor Corporation, "FAN Controller CG6457AM and CG6462AM," PSoC Mixed Signal Array Preliminary Data Sheet; May 24, 2005; 25 pages.
Cypress Semiconductor Corporation, "PSoC Mixed-Signal Controllers," Production Description; <http://www.cypress.com/portal/server>; retrieved on Sep. 27, 2005; 2 pages.
USPTO Notice of Allowance for U.S. Appl. No. 11/437,518 dated Feb. 23, 2010; 6 pages.
USPTO Non-Final Rejection for U.S. Appl. No. 11/437,518 dated Aug. 18, 2009; 10 pages.
USPTO Requirement for Restriction/Election for U.S. Appl. No. 11/437,518 dated Apr. 21, 2009; 6 pages.
USPTO Non-Final Rejection for U.S. Appl. No. 11/496,991 dated May 24, 2010; 16 pages.
USPTO Notice of Allowance for U.S. Appl. No. 11/496,991 dated Jan. 29, 2010; 6 pages.
USPTO Final Rejection for U.S. Appl. No. 11/496,991 dated Nov. 17, 2009; 17 pages.
USPTO Non-Final Rejection for U.S. Appl. No. 11/496,991 dated Jul. 31, 2009; 15 pages.
USPTO Non-Final Rejection for U.S. Appl. No. 11/395,674 dated Aug. 27, 2010; 15 pages.
USPTO Final Rejection for U.S. Appl. No. 11/605,819 dated Feb. 2, 2010; 15 pages.
USPTO Non-Final Rejection for U.S. Appl. No. 11/605,819 dated Aug. 11, 2009; 12 pages.
USPTO Advisory Action for U.S. Appl. No. 11/605,506 dated Apr. 12, 2010; 3 pages.
USPTO Final Rejection for U.S. Appl. No. 11/605,506 dated Feb. 3, 2010; 14 pages.
USPTO Non-Final Rejection for U.S. Appl. No. 11/605,506 dated Aug. 11, 2009; 11 pages.
USPTO Non-Final Rejection for U.S. Appl. No. 11/395,674 dated Aug. 27, 2010; 15 pages.
USPTO Non-Final Rejection for U.S. Appl. No. 11/432,130 dated Nov. 9, 2010; 13 pages.
USPTO Final Rejection for U.S. Appl. No. 11/480,016 dated Aug. 31, 2010; 19 pages.
USPTO Advisory Action for U.S. Appl. No. 11/480,016 dated Nov. 10, 2010; 3 pages.
USPTO Advisory Action for U.S. Appl. No. 11/437,507 dated Jul. 12, 2010; 2 pages.
USPTO Non-Final Rejection for U.S. Appl. No. 11/437,507 dated Sep. 23, 2010; 6 pages.

USPTO Advisory Action for U.S. Appl. No. 11/442,044 dated Aug. 31, 2010; 2 pages.
USPTO Notice of Allowance for U.S. Appl. No. 11/442,044 dated Oct. 4, 2010; 9 pages.
USPTO Final Rejection for U.S. Appl. No. 11/442,212 dated Oct. 13, 2010; 13 pages.
USPTO Final Rejection for U.S. Appl. No. 11/496,991 dated Oct. 22, 2010; 17 pages.
U.S. Appl. No. 11/480,016: "Bidirectional Slider," XiaoPing et al.; filed Jun. 29, 2006; 58 pages.
U.S. Appl. No. 11/442,212: "Mulit-function slider in touchpad," XiaoPing; filed May 26, 2006; 57 pages.
U.S. Appl. No. 11/442,044: "Multi-function slider in touchpad," XiaoPing et al.; filed May 26, 2006; 58 pages.
USPTO Non-Final Rejection for U.S. Appl. No. 11/442,212 dated Feb. 25, 2011; 13 pages.

TOUCH-SENSOR WITH SHARED CAPACITIVE SENSORS

TECHNICAL FIELD

This invention relates to the field of user interface devices and, in particular, to touch-sensing devices.

BACKGROUND

Computing devices, such as notebook computers, personal data assistants (PDAs), and mobile handsets, have user interface devices, which are also known as human interface device (HID). One user interface device that has become more common is a touch-sensor pad. A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a cursor, or selecting an item on a display. These touch-sensor pads can include multi-dimensional sensor arrays. The sensor array may be one dimensional, detecting movement in one axis. The sensor array may also be two dimensional, detecting movements in two axes.

FIG. 1A illustrates a conventional touch-sensor pad 100. The touch-sensor pad 100 includes a sensing surface 105 on which a conductive object may be used to position a cursor in the x- and y-axes. Touch-sensor pad 100 may also include buttons such as left and right buttons 110 and 115, respectively. These buttons 110 and 115 are typically mechanical buttons, and operate much like left and right buttons on a mouse. These buttons 110 and 115 permit a user to select items on a display or send other commands to the computing device.

FIG. 1B illustrates another aspect of the conventional touch-sensor pad 100. The touch-sensor pad 100 includes a plurality (e.g., twelve) of metal strips 120, which are also referred to as sensor elements. The sensor elements 120 are coupled to the processing device 125, which includes a plurality of capacitance sensors 130. The capacitance sensors 130 are also referred to as capsensors. Typically, each sensor element 120 is coupled to a corresponding capsensor 130 via an independent pin 135 (i.e., metal pin extending from the chip package of the processing device 125). Thus, the illustrated touch-sensor pad 100 has twelve pins 135 to independently couple each of the twelve sensor elements 120 to the corresponding capsensors 130 within the processing device 125. This one-to-one correspondence between sensor elements 120 and capsensors 130 limits the number of sensor elements 120 and, therefore, the size of a touch-sensor pad 120. Additionally, the functionality of the processing device 125 is limited by the number of pins 135 used for the capsensors 120 because the processing device 125 is not able to electrically connect to other components of the touch-sensor pad 100.

In general, the sensor elements 120 can be used to determine the location or position of a conductive object 140 such as a finger or stylus on the touch-sensor pad 100. For ease of discussion and illustration, the depicted touch-sensor pad 100 includes sensor elements 120 to detect the location and directional movement of the conductive object 140 along a single axis, for example, left-right. One type of touch-sensor pad 100 that detects only directional movement, but not necessarily the location, of the conductive object 140 is referred to as a directional slider. Other touch-sensor pads 100 detect movement in multiple directions such as left-right and up-down.

In order to determine the location and/or directional movement of the conductive object 140 relative to the sensor elements 120, the processing device 125 implements linear search algorithms on the sensor elements 120. With a linear search algorithm, capacitance variations of the sensor elements 120 are detected one-by-one in a linear fashion at the corresponding capsensors 130. By comparing the detected capacitance variation of a sensor element 120 with a baseline capacitance and the capacitance variations on neighboring sensor elements 120, the position of the conductive object 140 (e.g., x coordinate) is determined. For example, the processing device 125 may first detect the capacitance variation on the first sensor element 120, then on the second sensor element 120, and so on from left to right across several sensor elements 120. The processing device 125 implements this linear search algorithm by sequentially sampling the capsensors 130. If the conductive object 140 is on the first sensor element 120, then the processing device 125 only takes one cycle to sample the first capsensor 130. If the conductive object 140 is on the n-th sensor element 120, then the processing device 125 takes as many as n cycles to sample the first through the n-th capsensor 130. Accordingly, the processing device 125 takes, on average, (n+1)/2 cycles to locate the contacting point of the conductive object 140 using this linear search algorithm.

Accordingly, the one-to-one correspondence between the sensor elements 120, capsensors 130, and pins 135 limits the functionality of the processing device 125 and impacts the number of cycles used to detect the position or movement of the conductive object 140.

BRIEF DESCRIPTION OF THE DRAWINGS

The present invention is illustrated by way of example, and not by way of limitation, in the figures of the accompanying drawings.

DETAILED DESCRIPTION

Figure 1A:
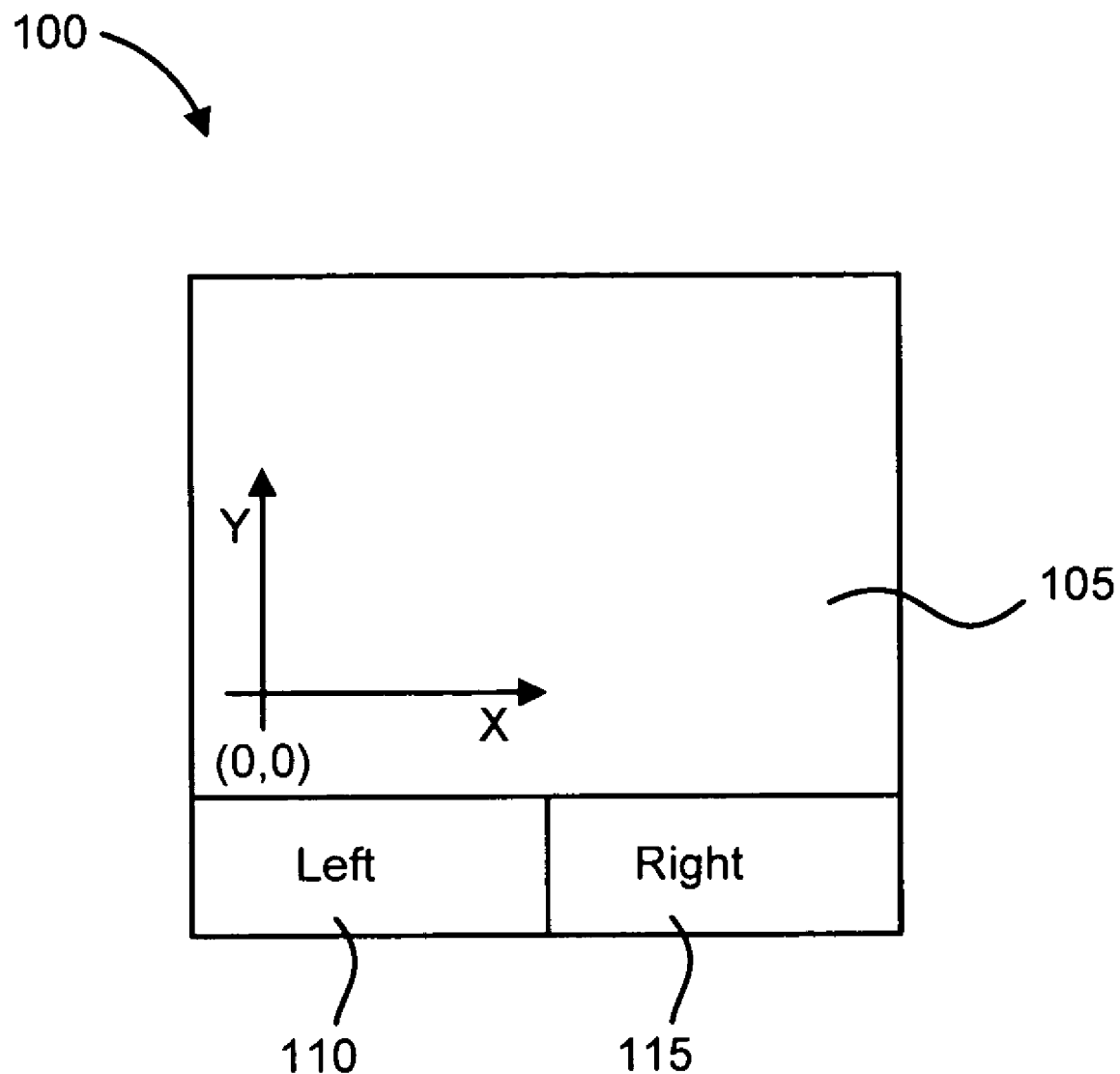
FIG. 1A illustrates a conventional touch-sensor pad.
Figure 1B:
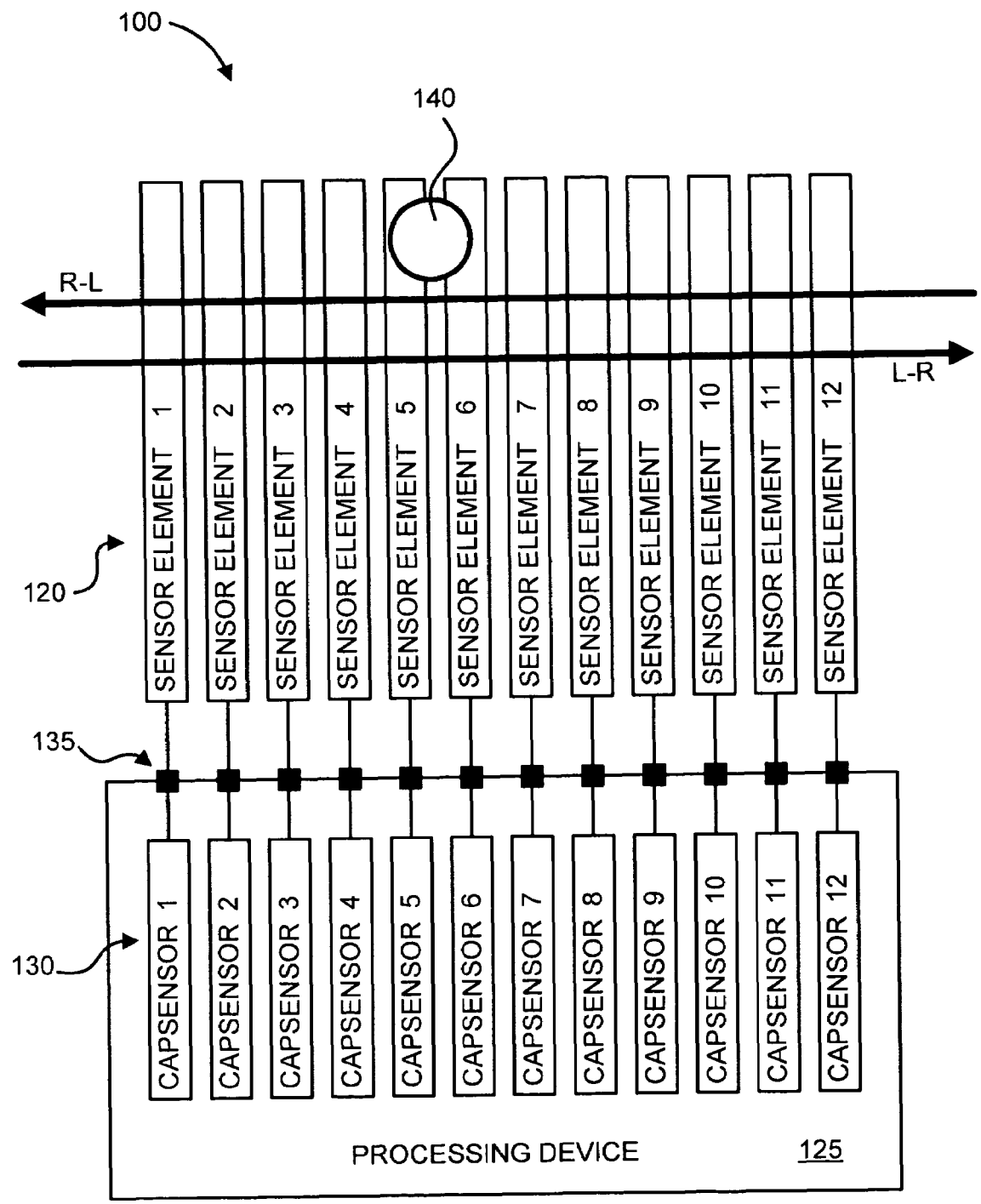
FIG. 1B illustrates another aspect of the conventional touch-sensor pad.

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

In general, this disclosure relates to touch-sensing devices. In one embodiment, an apparatus includes a first plurality of sensor elements, a second plurality of sensor elements, and a third plurality of sensor elements. The first plurality of sensor elements are coupled together. The second plurality of sensor elements are coupled together independently of the first plurality of sensor elements. The third plurality of sensor elements are coupled together independently of the first and second pluralities of sensor elements. The sensor elements of the first, second, and third pluralities of sensor elements are interspersed and disposed in a repetitive sequence along a movement path of a conductive object. In some embodiments, the repetitive sequence in a first direction along the movement path is unique compared to a reverse sequence in a reverse direction along the movement path. The movement path may be straight or curved. In one embodiment, the repetitive sequence may be 12312312 . . . where 1 refers to a sensor element from the first plurality of sensor elements, 2 refers to a sensor element from the second plurality of sensor elements, and 3 refers to a sensor element from the third plurality of sensor elements. The corresponding reverse sequence is 32132132 . . . , which is unique from the repetitive sequence. Other embodiments may have more than three pluralities of sensor elements.

Another embodiment of the apparatus includes a plurality of capsensors, a plurality of sensor elements, and a sequence detector. The plurality of sensor elements are coupled to the plurality of capsensors in a pattern. In one embodiment, at least two non-adjacent sensor elements of the plurality of sensor elements are coupled to a shared capsensor of the plurality of capsensors, and at least one other sensor element of the plurality of sensor elements is disposed between the two non-adjacent sensor elements and coupled to another capsensor of the plurality of capsensors. The sequence detector is coupled to the plurality of capsensors to detect a conductive sequence of a movement of a conductive object in proximity to at least some of the plurality of sensor elements. Referring to the example above, the sequence detector may detect 12312312 . . . if the movement is in a first direction and 32132132 . . . if the movement is in a second (e.g., reverse) direction. Another embodiment of the apparatus includes a plurality of switches coupled between the plurality of sensor elements and the plurality of capsensors. Other embodiments of the apparatus are also described.

One embodiment of a method includes detecting a conductive object at a plurality of sensor elements, wherein the plurality of sensor elements are disposed in a layout according to a repetitive, directional sequence, and determining whether a movement of the conductive device relative to the plurality of sensor elements is in a first direction according to the repetitive, directional sequence or in a second direction according to a unique reverse sequence of the repetitive, directional sequence. The method also may include differentiating between the repetitive, directional sequence and the unique, reverse sequence. The method also may include defining the repetitive, directional sequence and the unique reverse sequence according to a plurality of capsensors to which each sensor element of the plurality of sensor elements is coupled. The method also may include switching a plurality of switches to couple the plurality of sensor elements to the plurality of capsensors according to the repetitive, directional sequence. Other embodiments of the method are also described.

Figure 2:
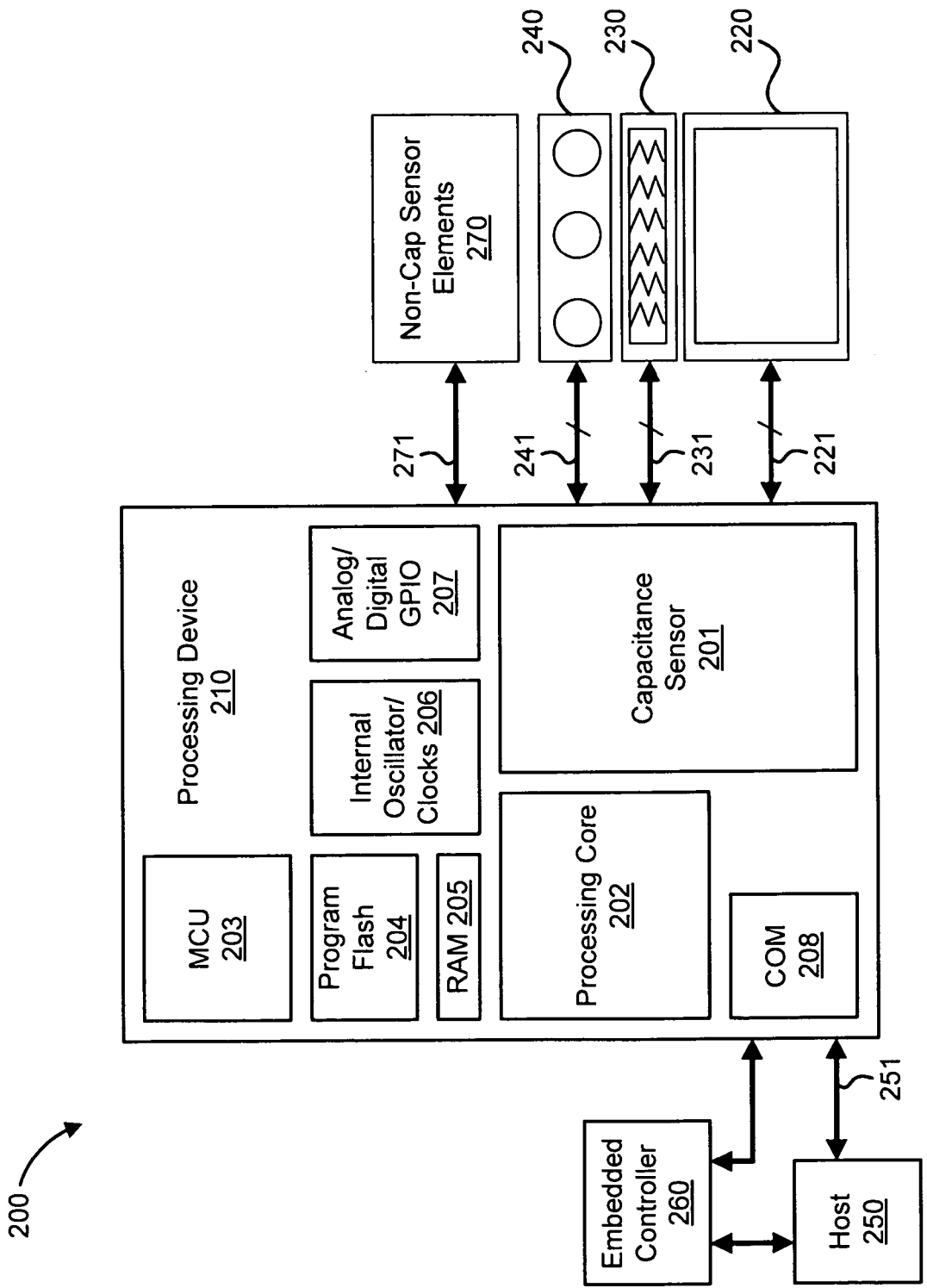
FIG. 2 illustrates a block diagram of one embodiment of an electronic system having a processing device for recognizing a gesture on a touch-sensor pad.

FIG. 2 illustrates a block diagram of one embodiment of an electronic system 200 having a processing device 210 for recognizing a gesture on a touch-sensor pad 200. The electronic system 200 includes a processing device 210, a touch-sensor pad 220, a touch-sensor slider 230, a touch-sensor buttons 240, a host processor 250, an embedded controller 260, and non-capacitance sensor elements 270. Although several components are shown and described, some embodiments of the electronic system 200 may include fewer or more components than are illustrated in FIG. 2.

The processing device 210 may include analog and/or digital general purpose input/output (GPIO) ports 207 such as programmable GPIO ports. The GPIO ports 207 may be coupled to a programmable interconnect and logic (PIL) component (not shown), which acts as an interconnect between the GPIO ports 207 and a digital block array (not shown) of the processing device 210. In one embodiment, the digital block array may be configured to implement a variety of digital logic circuits (e.g., DAC, digital filters, digital control systems, etc.) using configurable user modules (UMs). Additionally, the digital block array may be coupled to a system bus (not shown).

The processing device 210 also may include memory such as random access memory (RAM) 205 and program flash 204. In one embodiment, the RAM 205 may be static RAM (SRAM), and the program flash 204 may be non-volatile data storage, which may be used to store firmware (e.g., control algorithms executable by processing core 202 to implement some or all of the operations described herein). The processing device 210 also may include a memory controller unit (MCU) 203 coupled to the memory 204 and 205 and the processing core 202.

The processing device 210 also may include an analog block array (not illustrated), which is coupled to the system bus. The analog block array may be configured to implement a variety of analog circuits (e.g., ADC, analog filters, etc.) using configurable UMs. In one embodiment, the analog block array is coupled to the GPIO 207.

Some embodiments of the processing device 210 include one or more capacitance sensors 201 (also, capsensors 201). Each capsensor 201 may include analog UO such as pins for coupling to a component outside of the processing device 210. For example, the capsensors 201 may be coupled to the touch-sensor pad 220, the touch-sensor slider 230, the touch-sensor buttons 240, and/or other devices. The capsensor 201 and processing core 202 are described in more detail below.

It should be noted that the embodiments described herein can be implemented within or used in conjunction with several types of capacitive sensing devices. For example, embodiments may be implemented in touch-sensor pads 220 for notebook computers, a touch-slider 230 for lighting controls, touch-sensor buttons 240, and so forth. Similarly, the operations described herein may be implemented in several applications, including notebook cursor operations, lighting controls (e.g., dimmers), volume control, graphic equalizer control, speed control, or other control operations benefiting from gradual adjustments or a convenient touch-sensor interface. Additionally, embodiments may be used in conjunction with non-capacitive sensing elements 270, including but not limited to pick buttons, sliders (e.g., display brightness and contrast), scroll-wheels, multi-media controls (e.g., volume, track advance, etc.), handwriting recognition, and numeric keypad operation.

The electronic system 200 may include any combination of one or more touch-sensor pads 220, touch-sensor sliders 230, and/or touch-sensor buttons 240. In some embodiments, the electronic system 200 includes a touch-sensor pad 220 coupled to the processing device 210 via a bus 221. The touch-sensor pad 220 may include a multi-dimension sensor array, which includes sensor elements organized in two directions such as in rows and columns.

In some embodiments, the electronic system 200 includes a touch-sensor slider 230 coupled to the processing device 210 via a bus 231. The touch-sensor slider 230 may include a single-dimension sensor array, which includes sensor elements organized in a single direction such as in a row or columns. Alternatively, a single-dimension sensor array may include sensor elements organized in other arrangements which correspond to a single path of movement of the conductive object. For example, a slider wheel, although curved, may be implemented with a single-dimension sensor array because the sensor elements detect movement in either a clockwise or counter-clockwise direction analogous to left-right or up-down movements.

In some embodiments, the electronic system 200 includes a touch-sensor button 240 coupled to the processing device 210 via the bus 241. The touch-sensor button 240 may include a single-dimension or multi-dimension sensor array. For a touch-sensor button 240, the plurality of sensor elements may be independent or coupled together to detect a presence of a conductive object anywhere over the entire surface of the sensing device. One exemplary implementation of a touch-sensor button 240 is a non-contact switch which, when protected by an insulating layer, offer protection from severe environments.

In another embodiment, the electronic system 200 also may include non-capacitance sensor elements 270 coupled to the processing device 210 via the bus 271. The non-capacitance sensor elements 270 may include buttons, light emitting diodes (LEDs), and other user interface devices such as a mouse, a keyboard, or other functional keys that do not require capacitance sensing. In some embodiments, the buses 271, 241, 231, and 221 may be a single bus or configured into any combination of one or more separate buses. The processing device 210 also may provide value-added functionality such as keyboard control integration, LEDs, battery charger and general purpose I/O, as illustrated as non-capacitance sensor elements 270. In one embodiment, the non-capacitance sensor elements 270 are coupled to the GPIO 207.

The illustrated processing device 210 also includes internal oscillator/clocks 206 and a communication block 208. The oscillator/clocks 206 provide clock signals to one or more of the components of processing device 210. The communication block 208 facilitates communications with one or more external components such as the host processor 250 via the host interface (I/F) line 251. Alternatively, the processing block 210 also may be coupled to the embedded controller 260 to communicate with the external components such as the host 250. Interfacing to the host 250 can be through various methods. In one exemplary embodiment, interfacing with the host 250 may be done using a standard PS/2 interface to connect to an embedded controller 260, which in turn sends data to the host 250 via a low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via the host interface line 251. Alternatively, the processing device 210 may communicate to external components such as the host 250 using industry standard interfaces such as USB, PS/2, inter-integrated circuit (I2C) bus, or system packet interface (SPI). The host 250 and/or embedded controller 260 may be coupled to the processing device 210 with a ribbon or flex cable from an assembly which houses the touch-sensor pad 220 and processing device 210.

In one embodiment, the processing device 210 is configured to communicate with the embedded controller 260 or the host 250 to send data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of the host 250. These drivers enable the processing device 210 and sensing device to operate as a standard cursor control user interface device such as a two-button PS/2 mouse. The enhanced mode may enable additional features such as scrolling (reporting absolute position) or disabling the sensing device such as when a mouse is plugged into the notebook. Alternatively, the processing device 210 may be configured to communicate with the embedded controller 260 or the host 250 using non-OS drivers such as dedicated touch-sensor pad drivers, or other drivers known by those of ordinary skill in the art. In other words, the processing device 210 may operate to communicate data (e.g., commands or signals) using hardware, software, and/or firmware, and the data may be communicated directly to a processing device of the host 250 such as a host processor or, alternatively, may be communicated to the host 250 via drivers of the host 250, such as OS drivers or non-OS drivers. It should also be noted that the host 250 may directly communicate with the processing device 210 via the host interface 251.

In one embodiment, the data sent to the host 250 from the processing device 210 relates to commands including click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures that occur on the sensing device and are recognized by the processing device 210. Exemplary gestures include tap, push, hop, and zigzag gestures. A tap gesture occurs, for example, when a conductive object (e.g., finger) is detected on the sensing device for less than a threshold time. If the time the finger is placed on the touchpad is greater than the threshold time, then the detected gesture may be considered to be a movement of the cursor in one or more directions. Scroll-up, scroll-down, scroll-left, and scroll-right, step back, and step-forward gestures may be detected when the absolute position of the conductive object is within a pre-defined area and movement of the conductive object is detected. Alternatively, other gestures may be recognized. Similarly, signals may be sent that indicate the recognition of operations related to these gestures.

In one embodiment, the processing device 210 may reside on a common carrier substrate such as an integrated circuit (IC) die substrate, a multi-chip module substrate, or the like. Alternatively, the components of the processing device 210 may be one or more separate integrated circuits and/or discrete components. In one exemplary embodiment, the processing device 210 may be a Programmable System on a Chip (PSoC™) processing device, manufactured by Cypress Semiconductor Corporation, San Jose, Calif. Alternatively, the processing device 210 may include one or more other processing devices such as a microprocessor or central processing unit, a controller, special-purpose processor, digital signal processor (DSP), an application specific integrated circuit (ASIC), a field programmable gate array (FPGA), or the like, known by those of ordinary skill in the art. In another embodiment, the processing device 210 may be a network processor having multiple processors including a core unit and multiple microengines. Additionally, the processing device 210 may include any combination of general-purpose processing device(s) and special-purpose processing device(s).

It should also be noted that the embodiments described herein are not limited to having a configuration of a processing device 210 coupled to a host 250, but may include a system that measures the capacitance on the sensing device 220 and sends the raw data to a host computer 250 where it is analyzed by an application. In other words, the processing of the raw data may be done by the processing device 210 and/or the host 250.

In one embodiment, a fully self-contained touch-sensor pad 220 is implemented which outputs fully processed x/y movement and gesture data signals or data commands to a host 250. In another embodiment, a touch-sensor pad 220 is implemented which outputs x/y movement data and also finger presence data to a host 250, and the host 250 processes the received data to detect gestures. In another embodiment, the a touch-sensor pad 220 is implemented which outputs raw capacitance data to a host 250, and the host 250 processes the capacitance data to compensate for quiescent and stray capacitance, as well as calculates x/y movement and detects gestures by processing the capacitance data. In another embodiment, a touch-sensor pad 220 is implemented which processes and outputs capacitance data to compensate for quiescent and stray capacitance to a host 250, and the host 250 calculates x/y movement and detects gestures from the pre-processed capacitance data.

In one embodiment, the electronic system 200 implements a conventional laptop touch-sensor pad 220. Alternatively, the electronic system 200 may be implemented in a wired or wireless keyboard with an integrated touch-sensor pad 220, which is connected to a host 250 via the wired or wireless connection. In such an implementation, the processing described above as being performed by the "host" may be performed in part or in whole by the keyboard controller, which may then pass fully processed, pre-processed or unprocessed data to the system host 250. In another embodiment, the electronic system 200 may be a mobile handset (e.g., cell phone) or other electronic device having a touch-sensor pad 220 which operates in two or more modes. For example, the touch-sensor pad 220 may operate either as a touch-sensor pad 220 for x/y positioning and gesture recognition, or as a keypad or other array of touch-sensor buttons 240 and/or sliders 230. In other words, a touch-sensor pad 220 may implement touch-sensor buttons 240 and sliders 230 at the same time on different areas of the pad 220 or at different times in the same area of the pad 220. Alternatively, the electronic system 200 may be a mobile handset, a personal data assistant (PDA), a television, a remote control, a monitor, a handheld multi-media device, a handheld video player, a handheld gaming device, a control panel, or another type of device.

The capacitance sensor 201 may be integrated into the IC of the processing device 210, or alternatively, in a separate IC. Alternatively, embodiments of the capacitance sensor 201 may be incorporated into other integrated circuits. For example, behavioral level code describing the capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the capacitance sensor 201.

In one embodiment, capacitance sensor 201 is a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor sliders 230), and touch-sensor pads 220 implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches 230 or x/y touch-sensor pads 220, the software may calculate a position of the conductive object to greater resolution than the physical pitch of the switches.

Figure 3A:
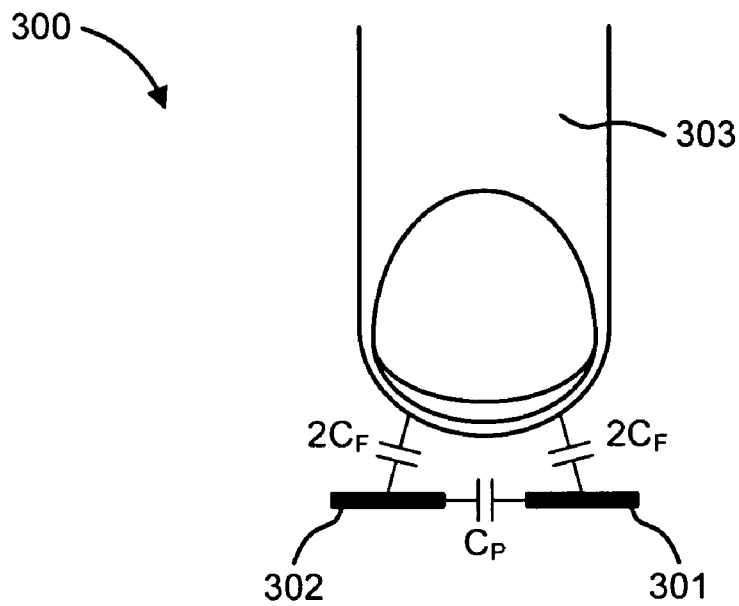
FIG. 3A illustrates a varying switch capacitance.
Figure 3B:
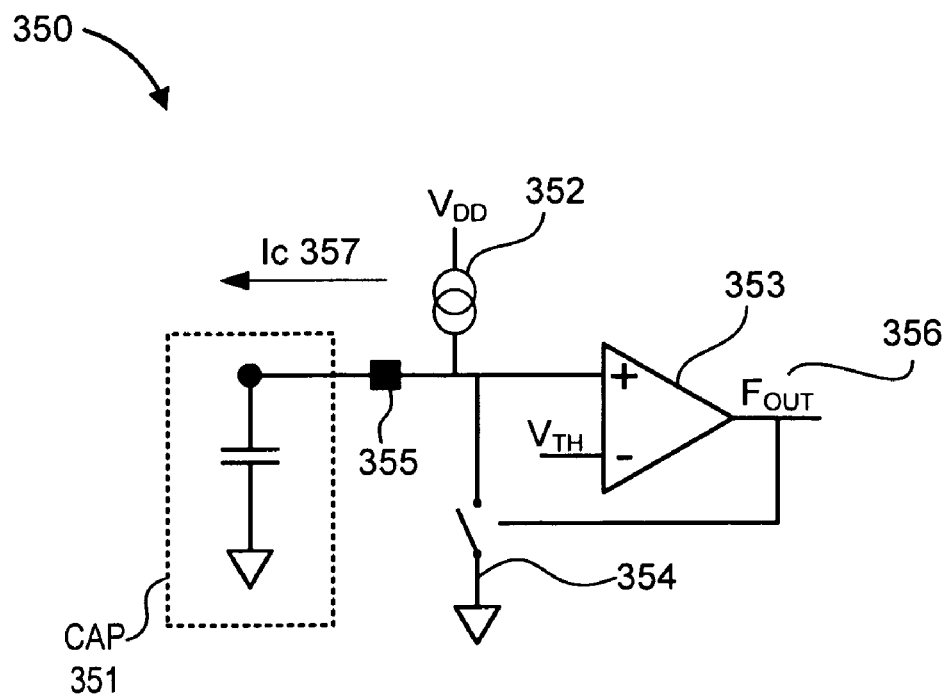
FIG. 3B illustrates a schematic diagram of one embodiment of a relaxation oscillator.

FIG. 3A illustrates a varying switch capacitance. In its basic form, a capacitive switch 300 is formed by a pair of adjacent plates 301 and 302. There is a small edge-to-edge capacitance, $C_P$, (also referred to as base capacitance) between the plates 301 and 302, but the intent of the switch layout is to minimize the base capacitance between these plates. When a conductive object 303 (e.g., finger, conductive door switch, position sensor, or conductive pen in a stylus tracking system, etc.) is placed in proximity to the plates 301 and 302, there is a capacitance $2C_F$ between one electrode 301 and the conductive object 303 and a similar capacitance $2C_F$ between the other electrode 302 and the conductive object 303. The total capacitance between one electrode 301 and the conductive object 303 and between the conductive object 303 and the other electrode 302 adds in parallel to the base capacitance between the plates 301 and 302, resulting in a change of capacitance equal to $C_F$. In one embodiment, the capacitive switch 300 may be used in a capacitance switch array, which is a set of capacitors where one side of each is grounded. Thus, the active capacitor (as represented in FIG. 3B as capacitor 351) has only one accessible side. The presence of the conductive object 303 increases the capacitance of the switch 300 to ground to approximately $C_P+C_F$. Determining switch activation is then a matter of measuring a change in the total capacitance $C_F$. The switch 300 is also known as a grounded variable capacitor. In one exemplary embodiment, $C_F$ may range from approximately 10-30 picofarads (pF). Alternatively, the total capacitance, $C_F$, may be another value.

Although the embodiments described herein use a relaxation oscillator, other embodiments use other methods such as current versus voltage phase shift measurement, resistor-capacitor charge timing, capacitive bridge divider, or charge transfer. The current versus voltage phase shift measurement method may include driving the capacitance through a fixed-value resistor to yield voltage and current waveforms that are out of phase by a predictable amount. The drive frequency can be adjusted to keep the phase measurement in a readily measured range. The resistor-capacitor charge timing method may include charging the capacitor through a fixed resistor and measuring timing on the voltage ramp. Small capacitor values may require very large resistors for reasonable timing. The capacitive bridge divider method may include driving the capacitor under test through a fixed reference capacitor. The reference capacitor and the capacitor under test form a voltage divider. The voltage signal is recovered with a synchronous demodulator, which may be done in the processing device 210. The charge transfer method may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details of these and other alternative embodiments for measuring capacitance are known by those of ordinary skill in the art.

FIG. 3B illustrates one embodiment of a relaxation oscillator 350. The relaxation oscillator 350 is coupled to a sensor element 351 (also referred to as a capacitor), which is located within a touch-sensor device such as the touch-sensor pad 220. The relaxation oscillator 350 includes a charging current source 352, a comparator 353, and a reset switch 354. The illustrated capacitor 351 is representative of the capacitance measured on a sensor element of a sensor array. The relaxation oscillator 350 is coupled to drive a charging current, Ic, 357 in a single direction onto the capacitor 351, which is also referred to as a device under test ("DUT") capacitor. As the charging current 357 charges the capacitor 351, the voltage across the capacitor 351 increases with time as a function of the charging current 357 and its capacitance. Equation (1) describes the relationship between current, capacitance, voltage, and time for charging the capacitor 351.

$$CdV=I_C dt \qquad (1)$$

The relaxation oscillator 350 begins by charging the capacitor 351 from a ground potential, or zero voltage, and continues to charge the capacitor 351 at the fixed charging current 357 until the voltage across the capacitor 351 at node 355 reaches a reference voltage or threshold voltage, $V_{TH}$, 355. At $V_{TH}$ 355, the relaxation oscillator 350 allows the accumulated charge at node 355 to discharge (e.g., the capacitor 351 "relaxes" back to the ground potential), and then the process repeats itself. In particular, the output of the comparator 353 asserts a clock signal, $F_{OUT}$, 356 (e.g., asserted high), which enables the reset switch 354. This resets the voltage on the capacitor 351 at node 355 to ground and the charge cycle starts again. The relaxation oscillator outputs a relaxation oscillator clock signal 356 having a frequency, $f_{RO}$, which is dependent upon capacitance of the capacitor 351 and the charging current 357.

The comparator trip time of the comparator 353 and reset switch 354 add a fixed delay. The output of the comparator 353 is synchronized with a reference system clock (not shown) to guarantee that the comparator reset time is long enough to completely reset the charging voltage on capacitor 351. This sets a practical upper limit to the operating frequency. For example, if the capacitance of the capacitor 351 changes, then the frequency of the relaxation oscillator clock signal 356 will change proportionally according to Equation (1). By comparing the frequency of the relaxation oscillator clock signal 356 against the frequency, $f_{REF}$, of the known reference system clock signal, the change in capacitance can be measured. Accordingly, Equations (2) and (3) below describe a proportional relationship between a change in capacitance of the capacitor 351 and the frequency difference between the relaxation oscillator clock signal 356 and the reference system clock signal.

$$\Delta C \therefore \Delta f, \qquad \text{where} \quad (2)$$

$$\Delta f = f_{RO} - f_{REF} \qquad (3)$$

In one embodiment, a frequency comparator (not shown) may be coupled to receive the relaxation oscillator clock signal 356 and the reference system clock signal. The frequency comparator compares the frequencies, $f_{RO}$ and $f_{REF}$, and outputs a signal indicative of the frequency difference, $\Delta f$. By monitoring the frequency difference, a change in the capacitance of the capacitor 351 can be determined. In one exemplary embodiment, the relaxation oscillator 350 may be implemented using a 555 timer to implement the comparator 353 and reset switch 354. Alternatively, the relaxation oscillator 350 may be built using other circuitry. Additional details of relaxation oscillators 350 are known in by those of ordinary skill in the art.

Figure 4:
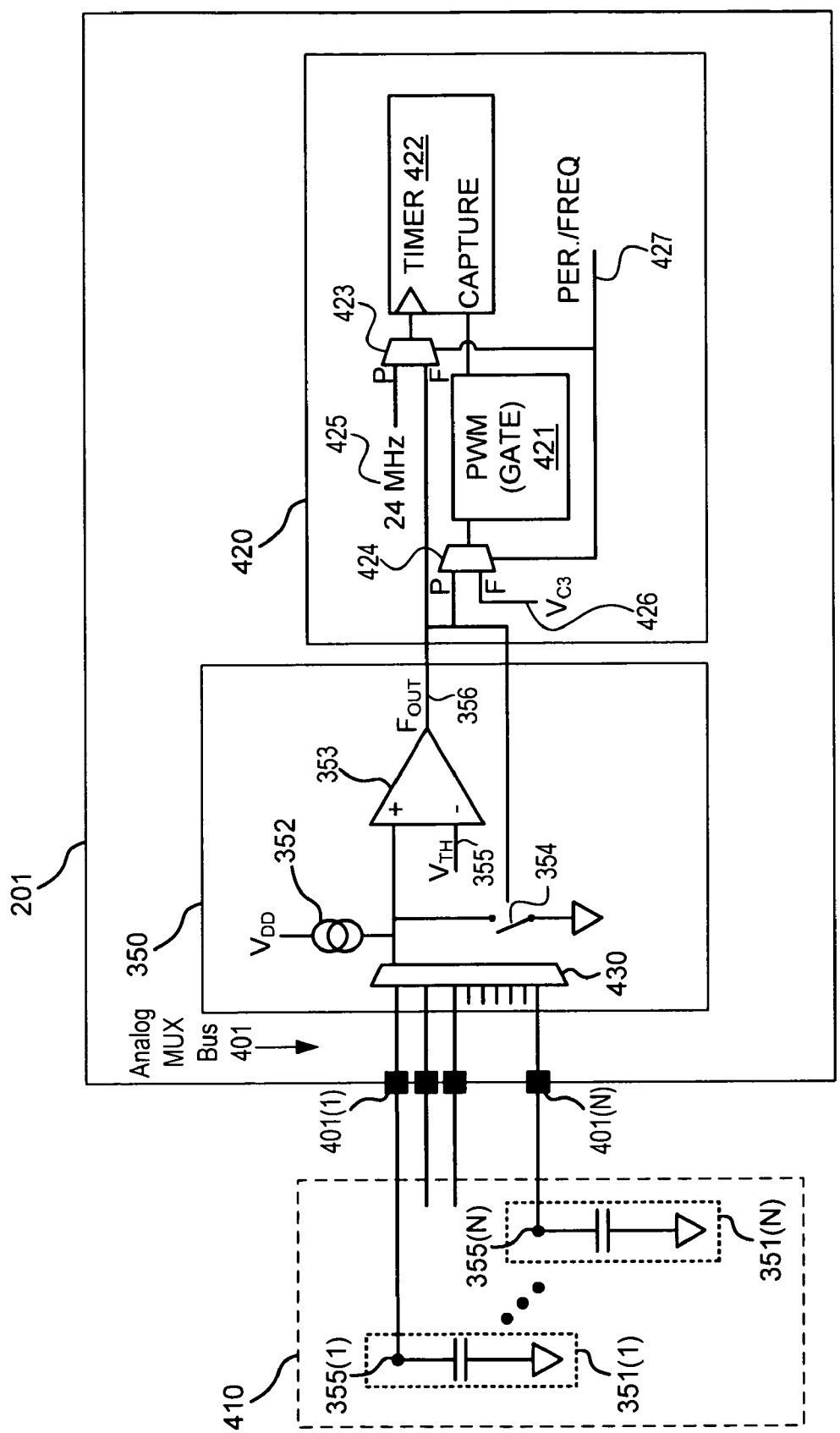
FIG. 4 illustrates a block diagram of one embodiment of a capacitance sensor including a relaxation oscillator and digital counter.

FIG. 4 illustrates a block diagram of one embodiment of a capacitance sensor 201 including a relaxation oscillator 350 and a digital counter 420. The capacitance sensor 201 is coupled to a sensor array 410 (also known as a switch array). The sensor array 410 includes a plurality of sensor elements 355(1)-355(N), where N is a positive integer value that represents the number of rows (or alternatively columns) of the sensor array 410. Each sensor element 355 is represented as a capacitor 351, as previously described with respect to FIG. 3B. The sensor array 410 is coupled to the capacitance sensor 201 via an analog bus 401 having a plurality of pins 401(1)-401(N). In one embodiment, the sensor array 410 may be a single-dimension sensor array including the sensor elements 355(1)-355(N), where N is a positive integer value that represents the number of sensor elements 355 of the single-dimension sensor array 410. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements 355 of the multi-dimension sensor array 410. The multi-dimension sensor array 410 provides output data to the analog bus 401 of the processing device 210 (e.g., via bus 221).

The relaxation oscillator 350 of FIG. 4 includes all the components described with respect to FIG. 3B, as well as a selection circuit 430. The selection circuit 430 is coupled to the reset switch 354, the current source 352, the comparator 353, and the plurality of sensor elements 355(1)-355(N) via the pins 401. The selection circuit 430 may be used to allow the relaxation oscillator 350 to measure capacitance on multiple sensor elements 355 (e.g., rows or columns). In one embodiment, the selection circuit 430 sequentially selects a sensor element 355 of the plurality of sensor elements 355 to provide the charge current and to measure the capacitance of each sensor element 355. In one exemplary embodiment, the selection circuit 430 is a multiplexer array of the relaxation oscillator 350. Alternatively, the selection circuit 430 may be other circuitry outside the relaxation oscillator 350, or even outside the capacitance sensor 201 to select the sensor element 355 to be measured. The capacitance sensor 201 may include one relaxation oscillator 350 and digital counter 420 for the plurality of sensor elements 355 of the sensor array, as shown. Alternatively, capacitance sensor 201 may include multiple relaxation oscillators 350 and digital counters 425 to measure the capacitance on the plurality of sensor elements of 355 the sensor array 410. The multiplexer array 430 also may be used to ground the sensor elements 355 that are not being measured. This may be done in conjunction with a dedicated pin in the GPIO port 207.

In another embodiment, the capacitance sensor 201 simultaneously scans the sensor elements 355, as opposed to sequentially scanning the sensor elements 355 as described above. For example, the sensing device may include a sensor array 410 having a plurality of rows and columns. The rows may be scanned simultaneously, and subsequently the columns may be scanned simultaneously. In one exemplary embodiment, the voltages on all of the rows of the sensor array 410 are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension. In another exemplary embodiment, the voltages on all of the rows of the sensor array 410 are simultaneously moved in a positive direction, while the voltages of the columns are moved in a negative direction. Next, the voltages on all of the rows of the sensor array 410 are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other scanning methods known by those of ordinary skill in the art may be used to scan the sensing array 410.

In one embodiment, the digital counter 420 is coupled to the output of the relaxation oscillator 350 to receive the relaxation oscillator output signal 356, $F_{OUT}$. The digital counter 420 is configured to count at least one of a frequency or a period of the relaxation oscillator output received from the relaxation oscillator 350.

As previously described with respect to the relaxation oscillator 350, when a finger or conductive object is placed on the switch 300, the capacitance increases from $C_P$ to $C_P+C_F$, so the relaxation oscillator output signal 356 decreases. The relaxation oscillator output signal 356 is then fed to the digital counter 420 for measurement. There are at least two methods, frequency measurement and period measurement, for counting the relaxation oscillator output signal 356. In one embodiment, the digital counter 420 includes two multiplexers 423 and 424. The multiplexers 423 and 424 are configured to select the inputs for the pulse width modulator (PWM) 421 and the timer 422 for both of the measurement methods (the "P" input corresponds to the period measurement method; the "F" input corresponds to the frequency measurement method). Alternatively, other selection circuitry may be used to select the inputs for the PWM 421 and the timer 422. In another embodiment, the multiplexers 423 and 424 are not included in the digital counter 420. For example, the digital counter 420 may be configured in another measurement configuration.

In the frequency measurement method, the relaxation oscillator output signal 356 is counted for a fixed period of time. The timer 422 obtains the number of counts during the gate time. The frequency measurement method may operate well at low frequencies where the oscillator reset time is small compared to the oscillator period. The PWM 441 is clocked for a fixed period by a derivative of the system clock, $V_{C3}$, 426, which is a divider from the system clock 425. In one embodiment, the frequency of the system clock is 24 MHz, although other frequencies may be implemented. Pulse width modulation is a modulation technique which generates variable-length pulses to represent the amplitude of an analog input signal. Using the frequency measurement method, the PWM 421 outputs a representation of $V_{C3}$ 426. The output of the PWM 421 enables the timer 422 (e.g., 16-bit), which is clocked by the relaxation oscillator output signal 356. The timer 422 is reset at the start of the sequence, and the count value is read out at the end of the gate period.

In the period measurement method, the relaxation oscillator output signal 356 gates the timer 422, which is clocked by the system clock 425 (e.g., 24 MHz). In order to improve sensitivity and resolution, multiple periods of the oscillator are counted with the PWM 421. The output of the PWM 421 is used to gate the timer 422. In this method, the relaxation oscillator output signal 356 drives the clock input of the PWM 421. Using the period measurement method, the PWM 421 outputs a representation of the relaxation oscillator output signal 356. The output of the PWM 421 enables a timer 422 (e.g., 16-bit), which is clocked at the system clock frequency 425 (e.g., 24 MHz). When the output of PWM 421 is asserted (e.g., asserted high), the count starts by releasing the capture control. When the terminal count of the PWM 421 is reached, the capture signal is asserted (e.g., asserted high), stopping the count and setting an interrupt of the PWM 421. The timer value is read in this interrupt. The relaxation oscillator 350 is indexed to the next switch (e.g., from capacitor 351(1) to capacitor 351(2)) to be measured and the count sequence is started again.

The two counting methods may have equivalent performance in sensitivity and signal-to-noise ratio (SNR). In one embodiment, the period measurement method has a slightly faster data acquisition rate, but this rate may depend on the software and the values of the switch capacitances. In another embodiment, the frequency measurement method has a fixed-switch data acquisition rate.

The length of the counter 422 and the detection time required for the switch 351 are determined by sensitivity requirements. Small changes in the capacitance on capacitor 351 result in small changes in frequency because of the proportional relationship described in relation to Equation (2). In order to find these small changes, it may be necessary to count for a considerable time.

At startup (or boot) the switches (e.g., capacitors 351) are scanned and the count values for each switch 351 with no actuation are stored as a baseline array (Cp). The presence of a finger on one of the switches 351 is determined by the difference in counts between a stored value for no switch actuation and the acquired value with switch actuation, referred to here as Δn. The sensitivity of a single switch 351 is approximately:

$$\frac{\Delta n}{n} = \frac{Cf}{Cp} \qquad (4)$$

The value of Δn should be large enough for reasonable resolution and clear indication of switch actuation. This drives switch construction decisions.

The value of $C_F$ should be a relatively large fraction of the value of $C_P$, if possible. In one exemplary embodiment, the ratio of $C_F$ to $C_P$ is approximately between 0.01 to 2.0. Alternatively, the values may result in other ratios. Since the value of $C_F$ is determined by the surface area of the conductive object (e.g., finger) and the distance from the conductive object to the conductive traces (i.e., through an over-lying insulator), the baseline capacitance, $C_P$, should be minimized. The baseline capacitance includes the capacitance of the switch pad plus any parasitics, including routing and chip pin capacitance.

In switch array applications, variations in sensitivity among the switches 351 should be minimized. If there are large differences in Δn, one switch 351 may actuate at 1.0 cm, while another may not actuate until direct contact, which would present a non-ideal user interface device. There are numerous methods for balancing the sensitivity of the switches 351, including precisely matching on-board capacitance with PC trace length modification, adding balance capacitors on each switch's PC board trace, and/or adapting a calibration factor to each switch to be applied each time the switch is tested. In one embodiment, the PCB design may be adapted to minimize capacitance, including thicker PCBs where possible. In one exemplary embodiment, a PCB having a thickness of 0.062 inches is used. Alternatively, other thicknesses may be used. For example, a PCB having a thickness of 0.015 inches may be used.

It should be noted that the count window should be long enough for Δn to be a "significant number." In one embodiment, the "significant number" can be as little as 10, or alternatively, as much as several hundred. In one exemplary embodiment, where $C_F$ is 1.0% of $C_P$ (a typical "weak" switch), and where the switch threshold is set at a count value of 20, n is found to be:

$$n = \Delta n \cdot \frac{Cf}{Cp} = 2000 \qquad (5)$$

Adding a margin (e.g., 500 counts, for a total of 2500 counts) and running the frequency measurement method at 1.0 MHz, an exemplary detection time for the switch is approximately 4 microseconds. In the frequency measurement method, the frequency difference between a switch 351 with and without actuation (i.e., $C_P$+$C_F$ vs. $C_P$) is approximately:

$$\Delta n = \frac{t_{count} \cdot i_C}{V_{TH}} \frac{Cf}{Cp^2} \qquad (6)$$

This shows that the sensitivity variation between one channel and another is a function of the square of the difference in the static capacitances of the two channels. This sensitivity difference can be compensated using routines in high-level application programming interfaces (APIs).

In the period measurement method, the count difference between a switch with and without actuation (i.e., $C_P$+$C_F$ vs. $C_P$) is approximately:

$$\Delta n = N_{Periods} \cdot \frac{Cf \cdot V_{TH}}{i_C} \cdot f_{SysClk} \qquad (7)$$

The charge currents are typically lower and the period is longer to increase sensitivity, or the number of periods for which the frequency of the system clock is counted can be increased. In either method, by matching the static (parasitic) capacitances, $C_P$, of the individual switches 351, the repeatability of detection increases, making all switches 351 work at the same difference. Compensation for this variation can be done in software at runtime. The compensation algorithms for both the frequency measurement method and period measurement method may be included in the high-level APIs.

Some implementations of the relaxation oscillator 350 use a current source 352 programmed by a fixed-value resistor (not shown). Adjusting the value of the resistor may change the range of capacitance to be measured.

Using the multiplexer array 430, multiple sensor elements 351 may be sequentially scanned to provide current to and measure the capacitance from the capacitors 351 (e.g., sensor elements), as previously described. In other words, while one sensor element 351 is being measured, the remaining sensor elements 351 are grounded using the GPIO port 207. This drive and multiplex arrangement bypasses the existing GPIO 207 to connect the selected pin 401 to an internal analog multiplexer (mux) bus 401. The capacitor charging current (e.g., current source 352) and reset switch 353 are connected to the analog mux bus 401. This may limit the pin-count requirement to reduce the number of switches 351 to be addressed. In one exemplary embodiment, no external resistors or capacitors are required inside or outside the processing device 210 to enable operation.

The capacitor charging current 357 for the relaxation oscillator 350 is generated in a register programmable current output digital-to-analog converter (DAC, or IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult. The oscillator-reset time may add to the oscillator period, especially at higher frequencies. Also, there may be some variation to the magnitude of the IDAC output current 357 with operating frequency. Accordingly, the optimum oscillation frequency and operating current for a particular switch array 410 may be determined to some degree by experimentation.

In many capacitive switch designs, the two "plates" (e.g., 301 and 302) of the sensing capacitor 351 are actually adjacent PCB pads or traces, as indicated in FIG. 3A. Typically, one of these plates is grounded. Layouts for touch-sensor slider (e.g., linear slide switches) and touch-sensor pad applications have switches 351 that are immediately adjacent to one another. In this case, all of the switches 351 that are not active are grounded through the GPIO 207 of the processing device 210 dedicated to that pin 401. The actual capacitance between adjacent plates 301 and 302 is small, but the capacitance of the active plate (and its PCB trace back to the processing device 210) to ground, when detecting the presence of the conductive object 303, may be considerably higher (e.g., $C_P + C_F$). The capacitance of two parallel plates 301 and 302 is given by the following equation:

$$C = \varepsilon_0 \cdot \varepsilon_R \cdot \frac{A}{d} = \varepsilon_R \cdot 8.85 \cdot \frac{A}{d} \text{ pF/m} \tag{8}$$

The dimensions of Equation (8) are in meters. This is a very simple model of the capacitance, and actual capacitances may be influences by fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch 351 and any parasitics; 2) minimizing PC trace routing underneath switches 351; 3) utilizing a gridded ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches 230 may be used to facilitate gradual control adjustments. Examples include a lighting control (dimmer), volume control, graphic equalizer, and speed control. The switches 351 within a slider 230 are mechanically adjacent to one another. Actuation of one switch 351 results in partial actuation of physically adjacent switches 351. The actual position in the sliding switch 230 is found by computing the centroid location of the set of activated switches 351.

In applications for touch-sensor sliders 230 (e.g., sliding switches) and touch-sensor pads 220, it is often beneficial to determine finger (or other capacitive object) position to more resolution than the native pitch of the individual switches 351. The contact area of a finger 303 on a sliding switch 230 or a touch-pad 220 is often larger than any single switch 351. In one embodiment, in order to calculate the interpolated position using a centroid, the array 410 is first scanned to verify that a given switch location is valid. The requirement is for some number of adjacent switch signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \tag{9}$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other positioning methods may be used to locate the conductive object 303.

In one embodiment, a physical touchpad assembly is a multi-layered module to detect a conductive object 303. The multi-layer stack-up of a touchpad assembly includes a PCB, an adhesive layer, and an overlay. The PCB includes the processing device 210 and other components, such as the connector to the host 250, which may process operations for sensing the capacitance. These components are on a non-sensing side of the PCB. The PCB also includes the sensor array 410 on the opposite side, a sensing side, of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array 410 and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object 303) from the circuitry. The overlay may be, for example, ABS plastic, polycarbonate, glass, or polyester film such as Mylar™. Alternatively, other materials known by those of ordinary skill in the art may be used. In one exemplary embodiment, the overlay has a thickness of approximately 1.0 mm. In another exemplary embodiment, the overlay has a thickness of approximately 2.0 mm. Alternatively, other thicknesses may be used.

Figure 5A:
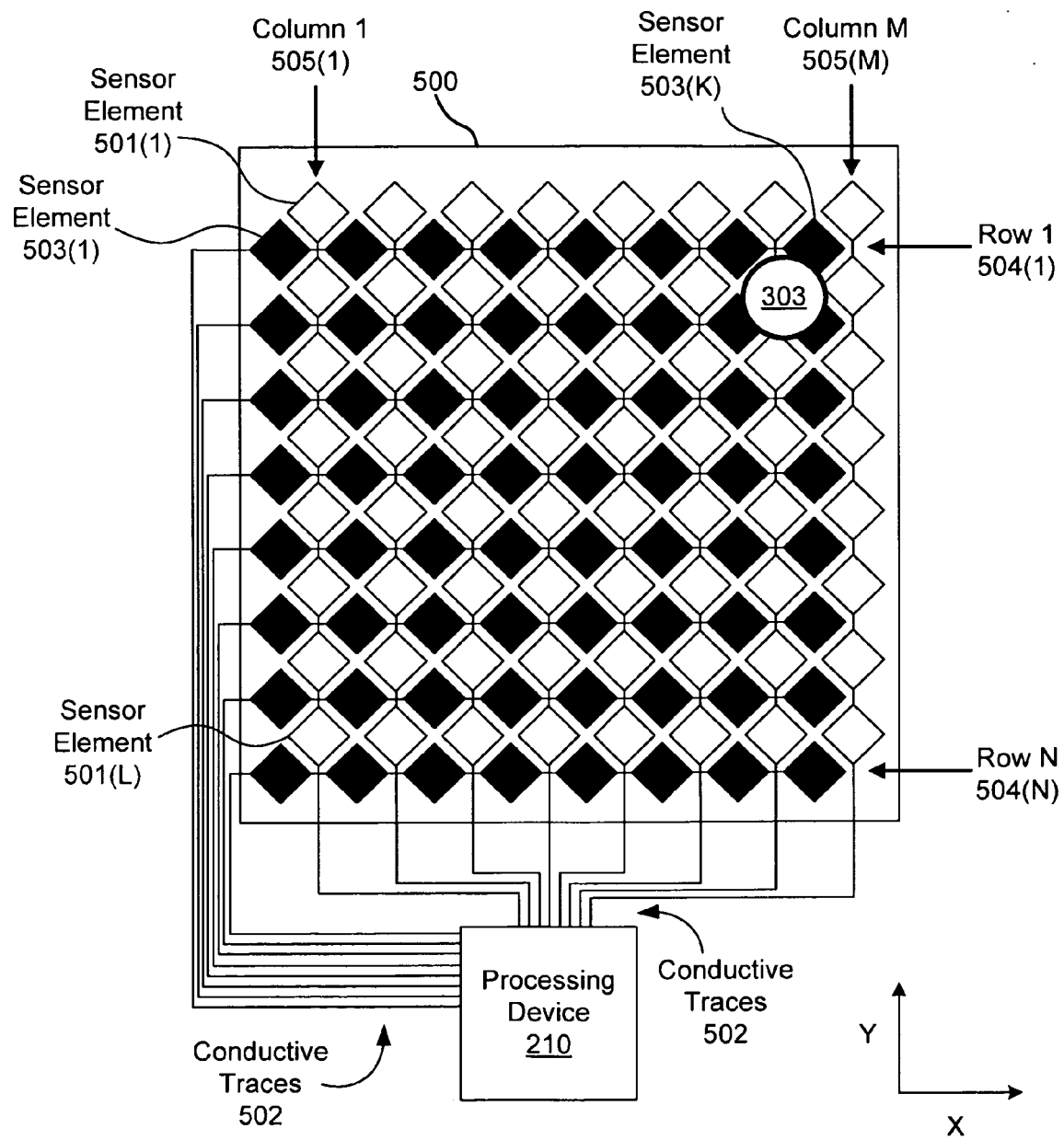
FIG. 5A illustrates a top-side view of one embodiment of a sensor array having a plurality of sensor elements for detecting a presence of a conductive object on the sensor array of a touch-sensor pad.

FIG. 5A illustrates a top-side view of one embodiment of a sensor array 500 having a plurality of sensor elements 501 and 503 for detecting a presence of a conductive object 303 on the sensor array 500 of a touch-sensor pad 220. The sensor array 500 includes a plurality of rows 504(1)-504(N), where N is a positive integer value, and a plurality of columns 505(1)-505(M), where M is a positive integer value. Each row includes a plurality of sensor elements 503(1)-503(K), where K is a positive integer value greater than or equal to one. Each column includes a plurality of sensor elements 501(1)-501(L), where L is a positive integer value greater than or equal to one. Accordingly, the sensor array 410 is an N×M sensor matrix. The N×M sensor matrix, in conjunction with the processing device 210, is configured to detect a position of the conductive object 303 in the directions of the rows 504 and columns 505.

Alternating columns 505 in FIG. 5A correspond to x- and y-axis elements. The y-axis sensor elements 503(1)-503(K) are illustrated as black diamonds, and the x-axis sensor elements 501(1)-501(L) are illustrated as white diamonds. Although diamonds are used in one embodiment, other embodiments may use other shapes of sensor elements 501 and 503, such as circles, squares, triangles, rectangular bars, or non-canonical shapes. Additionally, the sensor elements 501 and 503 may be located in one or more layers.

Figure 5B:
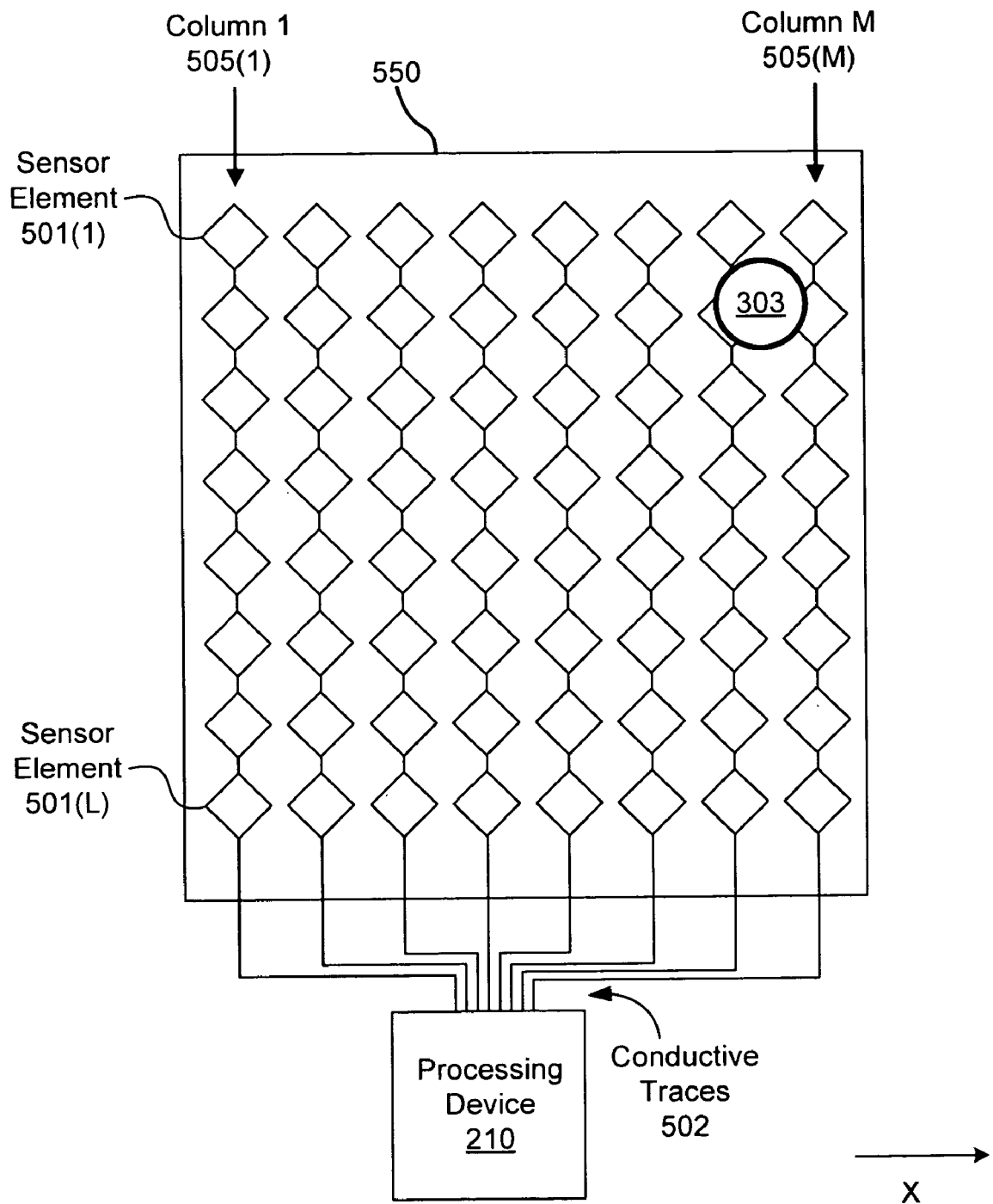
FIG. 5B illustrates a top-side view of one embodiment of a sensor array having a plurality of sensor elements for detecting a presence of a conductive object on the sensor array of a touch-sensor slider.

FIG. 5B illustrates a top-side view of one embodiment of a sensor array 550 having a plurality of sensor elements 501 for detecting a presence of a conductive object 303 on the sensor array 550 of a touch-sensor slider 230. The sensor array 550 includes a plurality of columns 504(1)-504(M), where M is a positive integer value. Each column includes a plurality of sensor elements 501(1)-501(L), where L is a positive integer value greater than or equal to one. Accordingly, sensor array is a 1×M sensor matrix. In one embodiment, the 1×M sensor matrix, in conjunction with the processing device 210, is configured to detect a position of the conductive object 303 in the x-direction. Alternatively, the sensor matrix may facilitate detection of directional movement of the conductive object 303. In this way, the sensor array 550 may be configured to function as a touch-sensor slider 230.

Figure 5C:
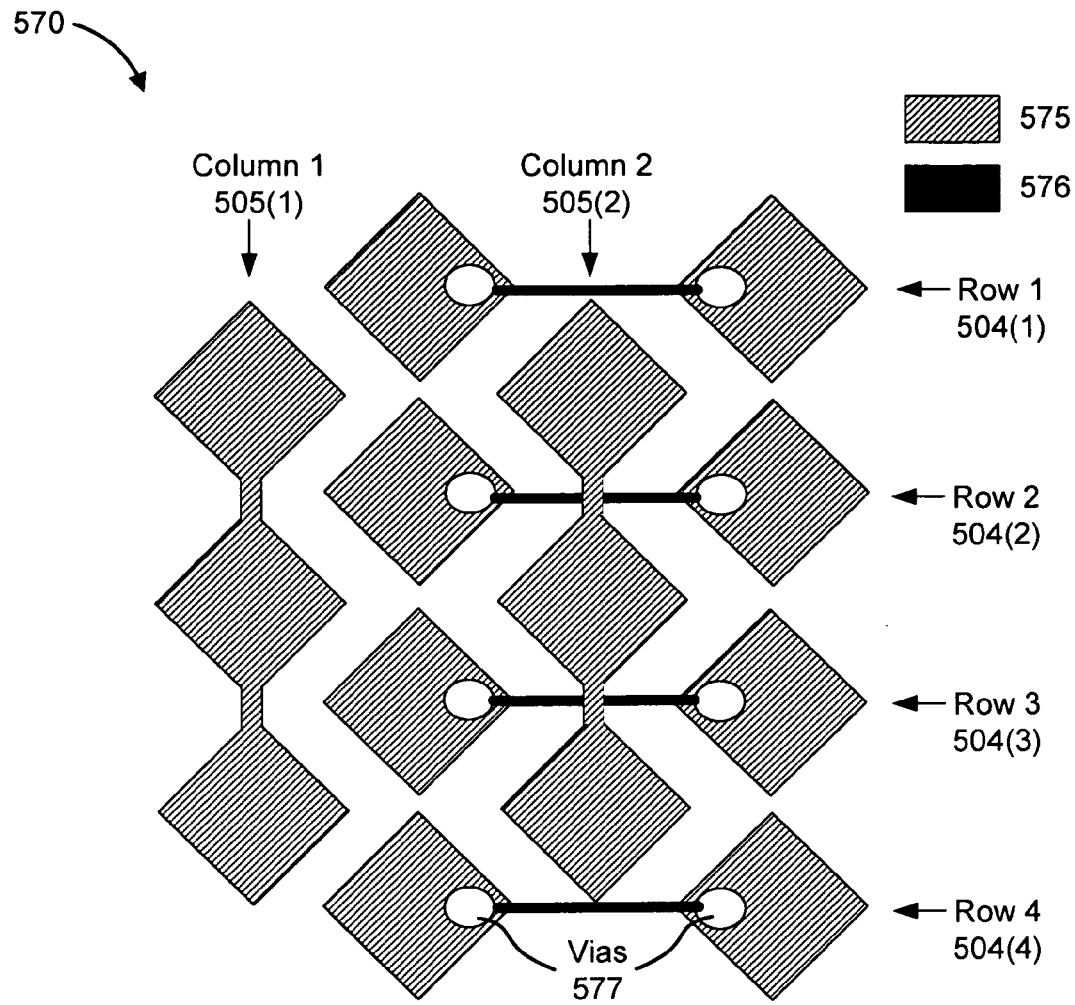
FIG. 5C illustrates a top-side view of one embodiment of a two-layer touch-sensor pad.
Figure 5D:
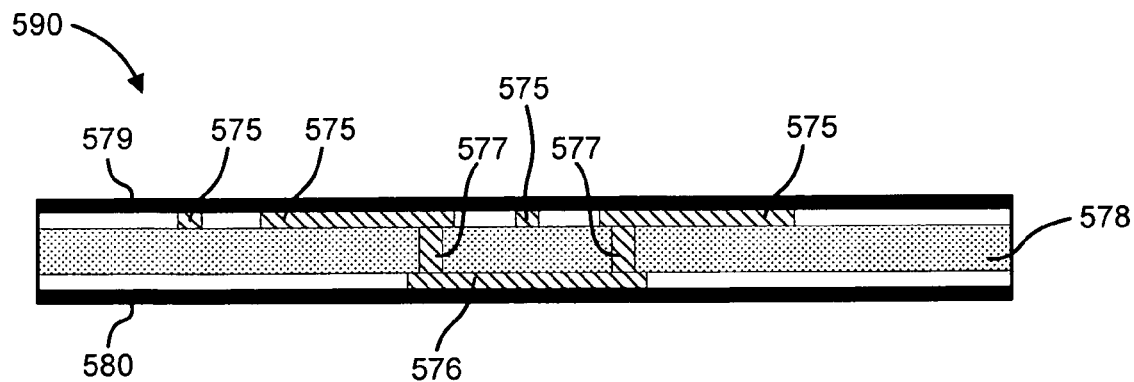
FIG. 5D illustrates a side view of one embodiment of the two-layer touch-sensor pad of FIG. 5C.

FIG. 5C illustrates a top-side view 570 of a portion of one embodiment of a two-layer touch-sensor pad 220. Similarly, FIG. 5D illustrates a side view 590 of a portion of one embodiment of a two-layer touch-sensor pad 220. The illustrated portion of the touch-sensor pad 220 includes sensor elements 501 of the first two columns 505(1)-505(2) and sensor elements 503 the first four rows 504(1)-504(4) of the sensor array 500. The sensor elements 501 of the first column 505(1) are connected together in the top conductive layer 575, illustrated as hashed diamond sensor elements and connections. The sensor elements 501 of the second column 505(2) are similarly connected in the top conductive layer 575. The sensor elements 501 of each column 505 form, in effect, a chain of sensor elements 501. The sensor elements 503 of the first row 504(1) also are located in the top conductive layer 575, but are connected together in the bottom conductive layer 576 using vias 577. The sensor elements 503 of the second, third, and fourth rows 504(2)-504(4) are similarly connected in the bottom conductive layer 576. The sensor elements 503 of each row 504 form, in effect, a chain of sensor elements 503.

As illustrated in FIG. 5D, the top conductive layer 575 includes the sensor elements 501 and 503 for both the columns 505 and the rows 504 of the sensor array 410, as well as the connections between the sensor elements 501 of the columns 505. The bottom conductive layer 576 includes the conductive paths that connect the sensor elements 503 of the rows 504. The conductive paths between the sensor elements 503 of the rows 504 use vias 577 to connect to one another in the bottom conductive layer 576. The vias 577 go from the top conductive layer 575, through a dielectric layer 578, to the bottom conductive layer 576. Some embodiments include coating layers 579 and 580 applied to the surfaces of the top and bottom conductive layers 575 and 576, opposite the surfaces that are coupled to the dielectric layer 578.

Although two-layer embodiments are shown and described herein, other embodiments may implement alternative connection schemes such as connecting the sensor elements 501 of the columns 505 using vias 577 to the bottom conductive layer 576. Furthermore, other embodiments may use less than or more than two layers. Additionally, in one embodiment, the sensing device (e.g., touch-sensor pad 220) is surrounded with a ground plane, so that the exterior elements and the interior elements have the same fringe capacitance to ground.

In some embodiments, an IC including the processing device 210 may be placed on the non-sensor side of the PCB. This placement does not necessary have to be in the center. The processing device IC is not required to have a specific set of dimensions for a touch-sensor pad, nor a certain number of pins. Alternatively, the IC may be placed somewhere external to the PCB.

Figure 6:
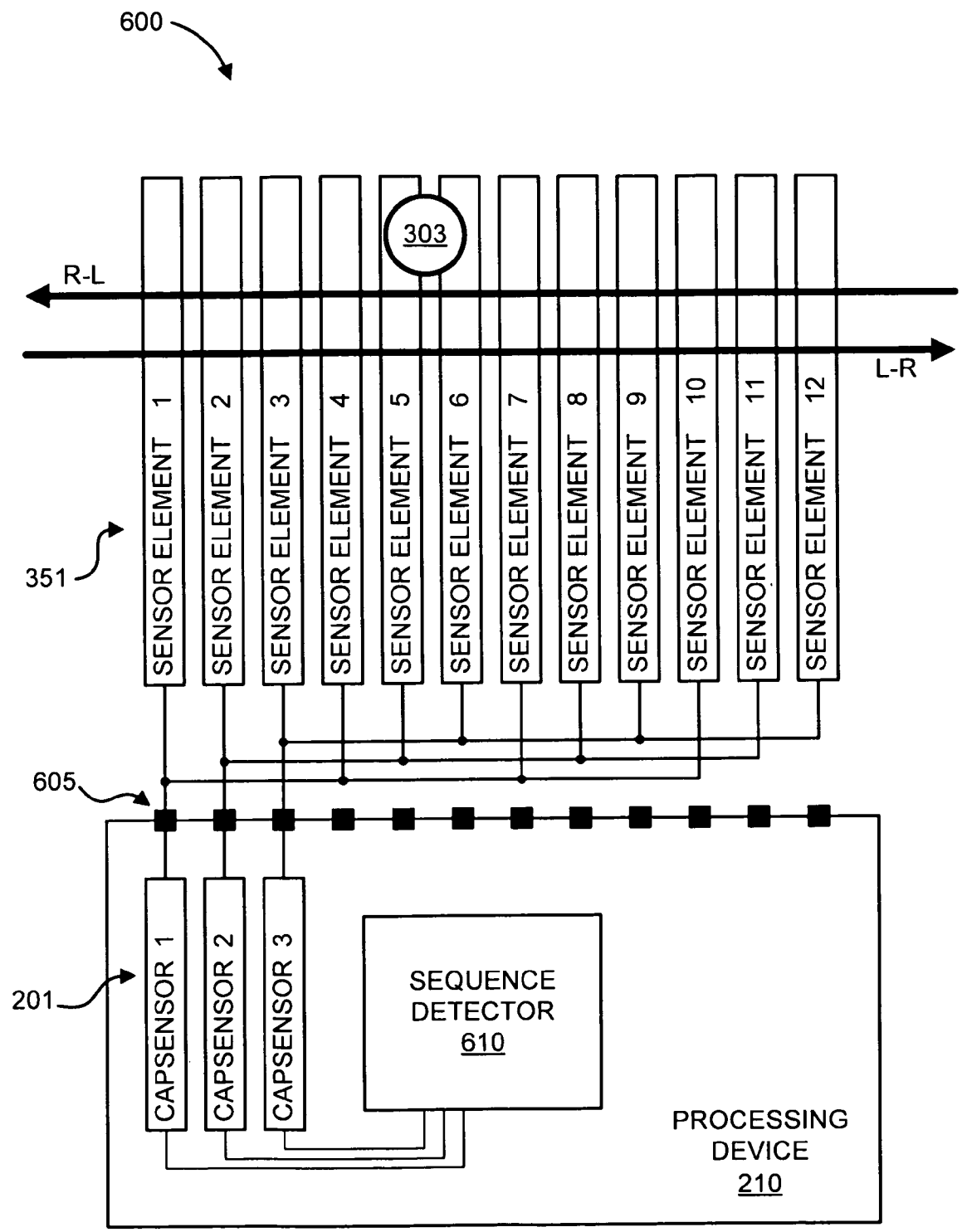
FIG. 6 illustrates one embodiment of a touch-sensor slider having multiple groups of sensor elements coupled to shared capacitive sensors.

FIG. 6 illustrates one embodiment of a touch-sensor slider 600 having multiple groups of sensor elements 351 coupled to shared capacitive sensors 201. In particular, the touch-sensor slider 600 includes twelve sensor elements 351, although other embodiments may have more or less sensor elements 351. For convenience, the sensor elements 351 are aligned in a left-right arrangement, referring to the path of movement of the conductive object 303 which may be detected by the touch-sensor slider 600. However, other embodiments may implement alternative arrangements of the sensor elements 351. For example, the sensor elements 351 may be arranged in an up-down arrangement or a clockwise-counter-clockwise arrangement.

The sensor elements 351 are in groups according to which capsensor 201 each sensor element 351 is coupled to. Specifically, there are three groups of sensor elements 351 depicted. The first group is coupled to capsensor 1 and includes sensor elements 1, 4, 7, and 10. The second group is coupled to capsensor 2 and includes sensor elements 2, 5, 8, and 11. The third group is coupled to capsensor 3 and includes sensor elements 3, 6, 9, and 12. Thus, the arrangement of the sensor elements 351 corresponds to a left-right sequence of 123123123123 using the capsensors 201 as indices, as shown in Table 1. The corresponding reverse (i.e., right-left) sequence is 321321321321, which is unique from the left-right sequence.

TABLE 1

Left-Right Sequence

| | SEQUENCE | | | | | | | | | | | |
|---|---|---|---|---|---|---|---|---|---|---|---|---|
| SENSOR ELEMENT | 1 | 2 | 3 | 4 | 5 | 6 | 7 | 8 | 9 | 10 | 11 | 12 |
| CAPSENSOR | 1 | 2 | 3 | 1 | 2 | 3 | 1 | 2 | 3 | 1 | 2 | 3 |

Having unique sequences in the two movement paths, or directions in which the conductive object 303 may be sensed, allows the processing device 210 to detect the directional movement of the conductive device 303 based on the sequence according to the capsensors 201 to which the sensor elements 351 are coupled. In one embodiment, the processing device 210 includes a sequence detector 610, which is coupled to the capsensors 201, to determine the detected sequence related to the movement of the conductive object 303. In one example, the processing device 210 determines that the conductive object 303 is sliding from left to right if the detected sequence is 123123 . . . , or even if only a portion of the sequence is detected (e.g., 12, 23, or 31). In contrast, the processing device 210 determines that the conductive object 303 is moving from right to left if the detected sequence is 321321 . . . , or a subset thereof (e.g., 32, 21, or 13) because the repeated sequence of 123 is unique from the repeated sequence of 321. Thus, one embodiment of the touch-sensor slider 600 beneficially allows the processing device 210, or another processing device, to determine the directional movement of the conductive object 303 relative to the sensor elements 351 even though there may be relatively few capsensors 201 which are shared among two or more sensor elements 351. Although, the touch-sensor slider 600 may be unable to determine the exact position of the conductive object 303 because the processing device 210 cannot determine, for example, if a signal at capsensor 1 originates from sensor element 1, 4, 7, or 10. Therefore, some embodiments of the touch-sensor slider 600 may be limited determining the direction of movement, but not the exact position, of the conductive object 303.

By using shared capsensors 201 coupled to groups of sensor elements 351, the processing device 210 may be able to improve the scan rate at which the capsensors 201 are scanned. In one embodiment, the scan rate is decreased to reduce the power consumption of the processing device 210. For example, the scan rate for three shared capsensors 201 may be one fourth of the scan rate for twelve independent capsensors 201. In another embodiment, the scan rate is effectively increased because there are relatively fewer capsensors 201 so each shared capsensor 201 is scanned more frequently than if there where an equal number of capsensors 201 and sensor elements 351. For example, the scan rate for three shared capsensors 201 effectively may be four times faster than the scan rate for twelve independent capsensors 201.

In one embodiment, the sensor elements 351 are coupled to the capsensors 201 via pins 605 on the package of the processor device 210. By coupling the sensor elements 351 together outside of the package of the processor device 210, relatively fewer pins 605 are used compared to a processing device that does not have shared capsensors 201. Using fewer pins 605 for the capsensing function may free up other pins 605 so that the processing device 210 can implement additional functions. Alternatively, the size of the processing device 210 may be decreased if less pins 605 are required on the package. Other embodiments may have additional benefits related to power consumption, functionality, size, or other performance considerations.

The coupling of the sensor elements 351 together into groups may be accomplished outside of the processing device 210, to conserve pins 605, or inside of the processing device 210. In one embodiment, the sensor elements 351 are coupled within close proximity to the sensor elements 351. In another embodiment, the sensor elements 351 are coupled within close proximity to the processing device 210. In another embodiment, the sensor elements 351 are coupled within an interconnect cable or trace between the sensor elements 351 and the processing device 210.

Figure 7:
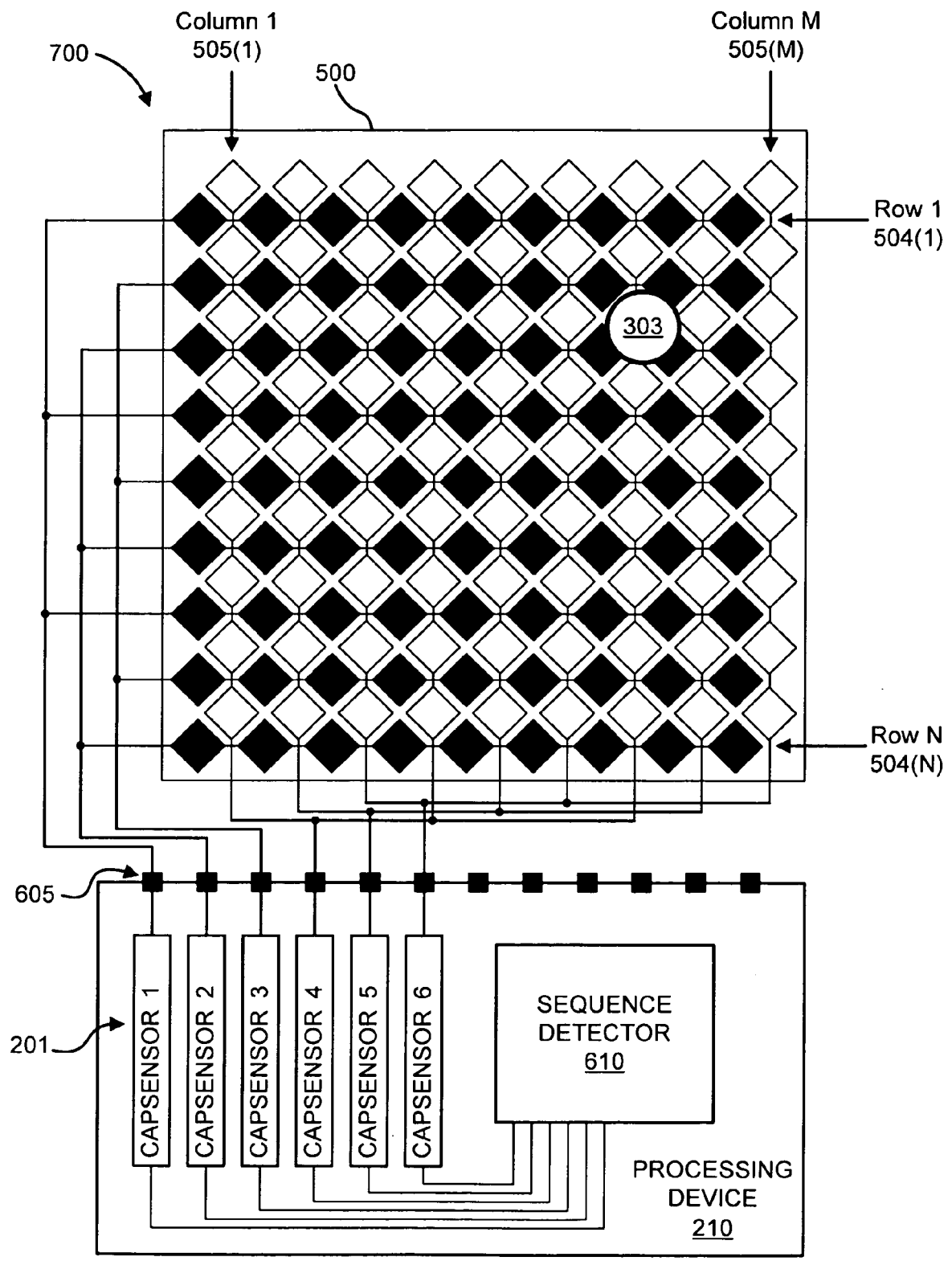
FIG. 7 illustrates one embodiment of a touch-sensor pad having multiple groups of sensor elements coupled to shared capacitive sensors.

FIG. 7 illustrates one embodiment of a touch-sensor pad 700 having multiple groups of sensor elements 351 coupled to shared capacitive sensors 201. In contrast to the touch-sensor slider 600, the touch-sensor pad 700 includes rows 504 and columns 505 of sensor elements 351. For clarification, although each row 504 and column 505 includes multiple sensor areas (e.g., diamond-shaped capacitive pads), each row 504 or column 505 of connected sensor areas may be referred to collectively as a sensor element 351 for purposes of this disclosure. In particular, the rows 504 and columns 505, whether including one or more sensor areas, is coupled to shared capsensors 201 according to a sequence associated with the rows 504 and columns 505—not the individual sensor areas of a single row 504 or column 505. Thus, some embodiments of the touch-sensor pad 700 may include sensor elements 351 in the shape of rectangular bars instead of the connected diamonds. Other embodiments may use other shapes of sensor elements 351.

The illustrated touch-sensor pad 700 includes sensor elements 351 of the rows 504 coupled to shared capsensors 201. For example, groups of three sensor elements 351 each are coupled to shared capsensors 1, 2, and 3, respectively. Similarly, groups of three sensor elements 351 of the columns 505 are coupled to shared capsensors 4, 5, and 6. The groupings of sensor elements 351 in the rows 504 and columns 505 present four unique sequences related to the following movement paths of a conductive object 303: left-to-right, right-to-left, top-to-bottom, and bottom-to-top. Table 2 shows these four unique sequences using the capsensors 201 as an index. Using the four unique sequences, the sequence detector 610 may determine the path of movement of the conductive object 303 relative to the sensor elements 351.

TABLE 2

Touch-Sensor Pad Sequences

| | SEQUENCE | | | | | | | | |
|---|---|---|---|---|---|---|---|---|---|
| LEFT-TO-RIGHT | 4 | 5 | 6 | 4 | 5 | 6 | 4 | 5 | 6 |
| RIGHT-TO-LEFT | 6 | 5 | 4 | 6 | 5 | 4 | 6 | 5 | 4 |
| TOP-TO-BOTTOM | 1 | 3 | 2 | 1 | 3 | 2 | 1 | 3 | 2 |
| BOTTOM-TO-TOP | 2 | 3 | 1 | 3 | 2 | 1 | 3 | 2 | 1 |

Figure 8:
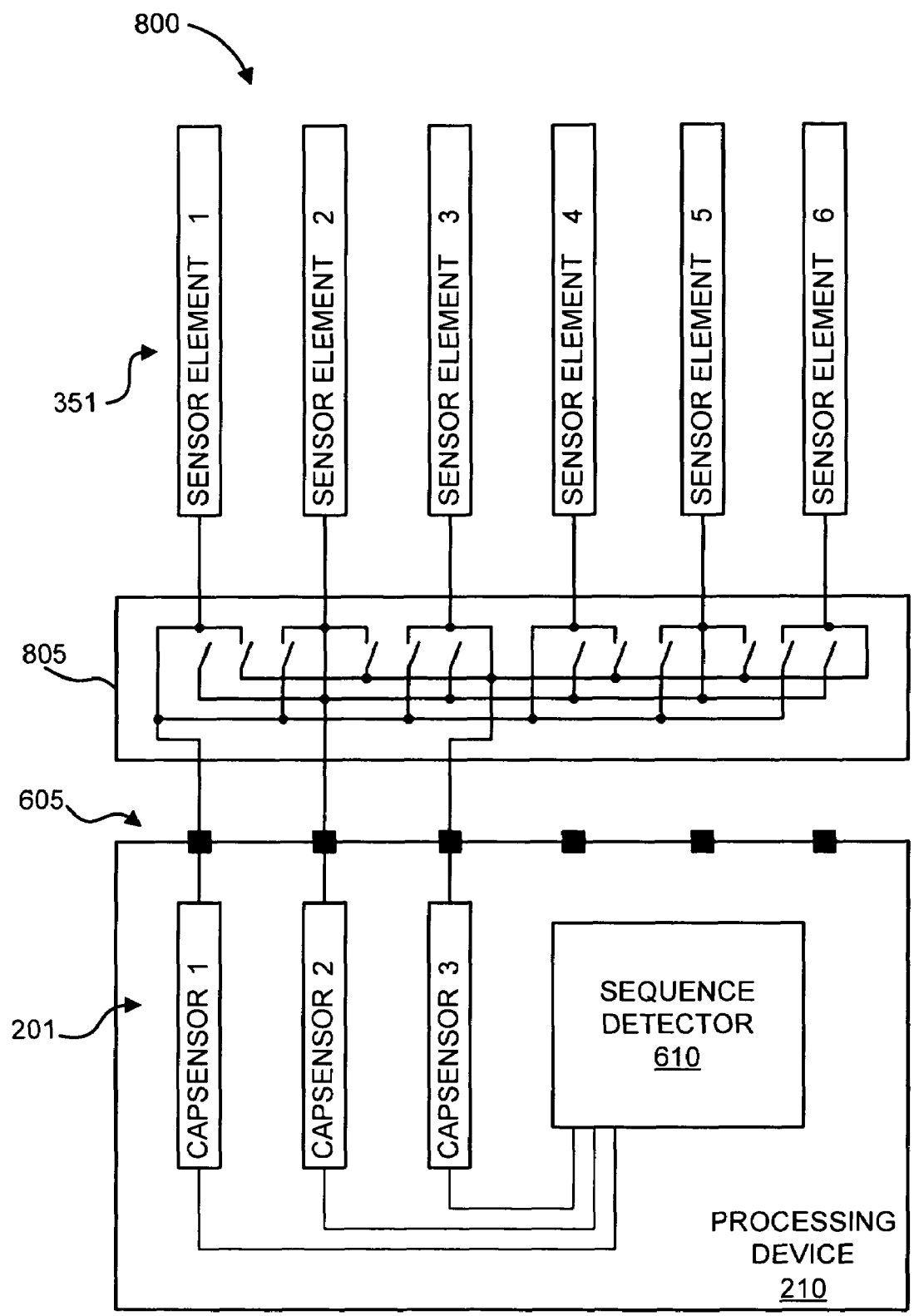
FIG. 8 illustrates one embodiment of a touch-sensor slider having a switch bank to couple the sensor elements to the capacitive sensors.

FIG. 8 illustrates one embodiment of a touch-sensor slider 800 having a switch bank 805 to couple the sensor elements 351 to the capacitive sensors 201. The switch bank 805 is also referred to as switch circuitry and may be implemented using one or more types of switches. In one embodiment, the switches are implemented using transistor circuitry. Alternatively, the switch bank may include one or more multiplexors, or other switching technology.

In general, the switch bank 805 includes switch circuitry to couple one or more sensor elements 351 to a shared capsensor 201. In the depicted embodiment, sensor elements 1 and 4 are coupled to capsensor 1, sensor elements 2 and 5 are coupled to capsensor 2, and sensor elements 3 and 6 are coupled to capsensor 3. In this way, the switch circuitry may determine the sequence of the sensor elements 351 based on the capsensors 201 to which each sensor element 351 is coupled (e.g., 123123). In other embodiments, the switch bank 805 also may be used to couple sensor elements 351 of the rows 504 of a touch-sensor pad 220 to additional capsensors 201 within the processing device 210.

Figure 9:
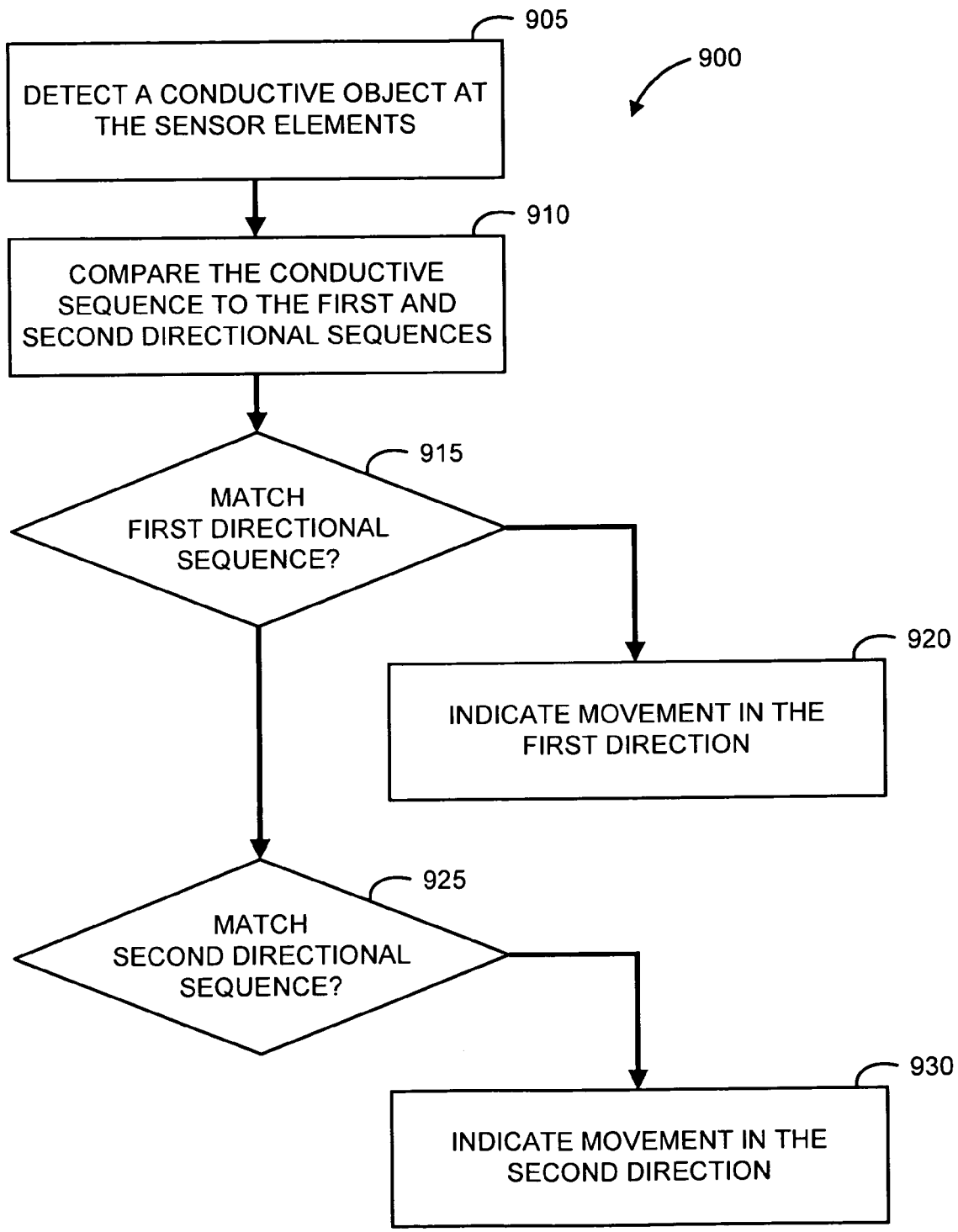
FIG. 9 illustrates a flow chart of one embodiment of a sequence detection method.

FIG. 9 illustrates a flow chart of one embodiment of a sequence detection method 900. The sequence detection method 900 is described in conjunction with a touch-sensor slider 230, but may be implemented in conjunction with various arrangements of sensor elements 351 and shared capsensors 201. The depicted sequence detection method 900 begins when the sequence detector 610 detects a conductive object 303 at the sensor elements 351. As described above, the sequence detector 610 scans the capsensors 201 to determine if a conductive object 303 is within the capacitive proximity of a sensor element 351 coupled to one of the capsensors 201.

The sequence detector 610 then compares the detected conductive sequence, related to sampled signals at the capsensors 201, to known sequences associated with typical movement paths of the conductive object 303. For example, the sequence detector 610 may compare the detected sequences with a left-to-right sequence of 123123123 . . . and a right-to-left sequence of 321321321 . . . to determine how the conductive object 303 moved relative to the sensor elements 351. The sequence detector 610 determines 915 if the detected sequence matches a first known directional sequence and, if so, indicates 920 movement in the first direction. Otherwise, the sequence detector 610 determines 925 if the detected sequence matches a second known directional sequence and, if so, indicates 930 movement in the second direction. The depicted sequence detection method 900 then ends.

Embodiments of the present invention, described herein, include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
a first plurality of sensor elements coupled together;
a second plurality of sensor elements coupled together independently of the first plurality of sensor elements;
a third plurality of sensor elements coupled together independently of the first and second pluralities of sensor elements, wherein the sensor elements of the first, second, and third pluralities of sensor elements are interspersed and disposed in a repetitive sequence along a movement path of a conductive object;
a first capacitive sensor coupled to the first plurality of sensor elements;
a second capacitive sensor coupled to the second plurality of sensor elements;
a third capacitive sensor coupled to the third plurality of sensor elements; and
a sequence detector coupled to the first, second, and third capacitive sensors to detect a conductive sequence of a movement of the conductive object in proximity to at least some of the first, second, and third pluralities of sensor elements.

2. The apparatus of claim 1, wherein the movement path comprises a straight path or a curved path.

3. The apparatus of claim 1, wherein the repetitive sequence in a first direction along the movement path is unique compared to a reverse sequence in a reverse direction along the movement path.

4. The apparatus of claim 1, wherein:
a first sensor element of the second plurality of sensor elements is disposed between a first sensor element of the first plurality of sensor elements and a first sensor element of the third plurality of sensor elements, forming a first iteration of sensor elements;
a second sensor element of the second plurality of sensor elements is disposed between a second sensor element of the first plurality of sensor elements and a second sensor element of the third plurality of sensor elements, forming a second iteration of sensor elements; and
the first iteration of sensor elements is disposed in sequence along the movement path with the second iteration of sensor elements.

5. The apparatus of claim 1, further comprising a sensor element of a fourth plurality of sensor elements which are independent of the first, second, and third pluralities of sensor elements.

6. The apparatus of claim 1, wherein the apparatus comprises a directional slider.

7. The apparatus of claim 1, further comprising:
a fourth plurality of sensor elements coupled together;
a fifth plurality of sensor elements coupled together; and
a sixth plurality of sensor elements coupled together, wherein the sensor elements of the fourth, fifth, and sixth pluralities of sensor elements are interspersed and disposed in a second repetitive sequence along a second movement path of the conductive object.

8. The apparatus of claim 7, wherein the sensor elements of the fourth, fifth, and sixth pluralities of sensor elements are disposed substantially orthogonal to the sensor elements of the first, second, and third pluralities of sensor elements.

9. The apparatus of claim 7, further comprising:
a fourth capacitive sensor coupled to the fourth plurality of sensor elements;
a fifth capacitive sensor coupled to the fifth plurality of sensor elements; and
a sixth capacitive sensor coupled to the sixth plurality of sensor elements.

10. The apparatus of claim 9, wherein the apparatus comprises a multi-dimensional, directional touchpad.

11. An apparatus, comprising:
a plurality of capacitive sensors;
a plurality of sensor elements coupled to the plurality of capacitive sensors, wherein at least two non-adjacent sensor elements of the plurality of sensor elements are coupled to a shared capacitive sensors of the plurality of capacitive sensors, and at least one other sensor element of the plurality of sensor elements is disposed between the two non-adjacent sensor elements and coupled to another capacitive sensors of the plurality of capacitive sensors; and
a sequence detector coupled to the plurality of capacitive sensors to detect a sequence for a movement of a conductive object in proximity to at least some of the plurality of sensor elements.

12. The apparatus of claim 11, wherein the plurality of sensor elements are disposed according to a repetitive sequence in a first direction along the movement path.

13. The apparatus of claim 12, wherein the repetitive sequence in the first direction is unique compared to a reverse sequence in a reverse direction along the movement path.

14. The apparatus of claim 11, further comprising a plurality of switches coupled between the plurality of sensor elements and the plurality of capacitive sensors.

15. A method, comprising:
    detecting a conductive object at a plurality of sensor elements, wherein the plurality of sensor elements are disposed in a layout according to a repetitive, directional sequence; and
    determining whether a movement of the conductive device relative to the plurality of sensor elements is in a first direction according to the repetitive, directional sequence or in a second direction according to a unique reverse sequence of the repetitive, directional sequence, wherein the first direction and the second direction are determined by a sequence detector.

16. The method of claim 15, further comprising differentiating between the repetitive, directional sequence and the unique, reverse sequence.

17. The method of claim 15, further comprising defining the repetitive, directional sequence and the unique reverse sequence according to a plurality of capacitive sensors to which each sensor element of the plurality of sensor elements is coupled.

18. The method of claim 17, further comprising switching a plurality of switches to couple the plurality of sensor elements to the plurality of capacitive sensors according to the repetitive, directional sequence.

* * * * *